United States Patent
Di Censo et al.

(10) Patent No.: US 10,575,117 B2
(45) Date of Patent: *Feb. 25, 2020

(54) DIRECTIONAL SOUND MODIFICATION

(71) Applicant: HARMAN INTERNATIONAL INDUSTRIES, INCORPORATED, Stamford, CT (US)

(72) Inventors: Davide Di Censo, Sunnyvale, CA (US); Stefan Marti, Oakland, CA (US); Joseph Verbeke, San Francisco, CA (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/006,783

(22) Filed: Jun. 12, 2018

(65) Prior Publication Data
US 2018/0302738 A1    Oct. 18, 2018

Related U.S. Application Data

(63) Continuation-in-part of application No. 15/464,172, filed on Mar. 20, 2017, now abandoned, which is a
(Continued)

(51) Int. Cl.
*H04S 7/00* (2006.01)
*H04R 3/12* (2006.01)
(Continued)

(52) U.S. Cl.
CPC .............. *H04S 7/304* (2013.01); *G06F 3/165* (2013.01); *G06F 3/167* (2013.01); *H04R 3/12* (2013.01);
(Continued)

(58) Field of Classification Search
CPC . H04R 1/32; H04R 3/12; H04R 25/40; H04R 25/407
See application file for complete search history.

(56) References Cited

U.S. PATENT DOCUMENTS

| 5,027,410 A | 6/1991 | Williamson et al. |
| 6,011,854 A | 1/2000 | Van Ryzin |

(Continued)

FOREIGN PATENT DOCUMENTS

| JP | 2005-192004 A | 7/2005 |
| WO | 2008/103925 A1 | 8/2008 |
| WO | 2011/063857 A1 | 6/2011 |

OTHER PUBLICATIONS

U.S. Appl. No. 14/148,689 entitled "System and Method for User Controllable Auditory Environment Customization", filed Jan. 6, 2014.

(Continued)

*Primary Examiner* — Brenda C Bernardi
(74) *Attorney, Agent, or Firm* — Artegis Law Group, LLP

(57) ABSTRACT

Various embodiments set forth techniques for directional sound modification. In one aspect, a system includes a plurality of audio sensors configured to acquire sound from an environment and at least one processor coupled to the plurality of audio sensors. The at least one processor is configured to determine a direction within the environment, generate an audio signal based on sound acquired from the direction within the environment, and transmit the audio signal to at least one audio output device to generate audio output. The audio output combines with sound from the direction within the environment to produce a modified sound.

19 Claims, 11 Drawing Sheets

Related U.S. Application Data continuation of application No. 14/563,458, filed on Dec. 8, 2014, now Pat. No. 9,622,013.

(51) Int. Cl.
  *G06F 3/16* (2006.01)
  *H04R 3/00* (2006.01)
  *G06F 3/01* (2006.01)

(52) U.S. Cl.
  CPC .............. *H04S 7/306* (2013.01); *G06F 3/017* (2013.01); *H04R 3/005* (2013.01); *H04R 2203/12* (2013.01); *H04R 2499/13* (2013.01); *H04S 2400/11* (2013.01); *H04S 2400/13* (2013.01)

(56) References Cited

U.S. PATENT DOCUMENTS

| | | |
|---|---|---|
| 6,879,688 B2 | 4/2005 | Winegar |
| 6,989,744 B2 | 1/2006 | Proebsting |
| 7,512,247 B1 | 3/2009 | Odinak et al. |
| 8,081,780 B2 | 12/2011 | Goldstein et al. |
| 8,194,900 B2 | 6/2012 | Fischer et al. |
| 8,285,244 B2 | 10/2012 | Girard et al. |
| 8,452,307 B1 | 5/2013 | Fujisaki |
| 8,477,955 B2 | 7/2013 | Engle et al. |
| 8,611,552 B1 | 12/2013 | Disler |
| 9,324,322 B1 | 4/2016 | Torok et al. |
| 9,437,188 B1 | 9/2016 | Medina et al. |
| 9,635,420 B2 | 4/2017 | Hoang |
| 9,646,628 B1 | 5/2017 | Carlson et al. |
| 2001/0046304 A1 | 11/2001 | Rast |
| 2005/0036637 A1 | 2/2005 | Janssen |
| 2005/0117771 A1 | 6/2005 | Vosburgh et al. |
| 2005/0226425 A1 | 10/2005 | Polk, Jr. |
| 2006/0094474 A1 | 5/2006 | Zatloukal et al. |
| 2006/0153394 A1 | 7/2006 | Beasley |
| 2007/0185601 A1 | 8/2007 | Lee et al. |
| 2007/0189544 A1 | 8/2007 | Rosenberg |
| 2008/0267416 A1 | 10/2008 | Goldstein et al. |
| 2009/0082071 A1 | 3/2009 | Hicks, III |
| 2009/0138507 A1 | 5/2009 | Burckart et al. |
| 2009/0279709 A1 | 11/2009 | Asada et al. |
| 2009/0290718 A1 | 11/2009 | Kahn et al. |
| 2010/0076793 A1 | 3/2010 | Goldstein et al. |
| 2010/0247082 A1 | 9/2010 | Caldwell et al. |
| 2010/0290632 A1 | 11/2010 | Lin |
| 2010/0302033 A1 | 12/2010 | Devenyi et al. |
| 2010/0332003 A1 | 12/2010 | Yaguez |
| 2011/0069843 A1 | 3/2011 | Cohen et al. |
| 2011/0107216 A1 | 5/2011 | Bi |
| 2012/0034904 A1 | 2/2012 | LeBeau et al. |
| 2012/0051561 A1* | 3/2012 | Cohen ..................... G10L 21/00 381/122 |
| 2012/0121103 A1* | 5/2012 | Cohen .................. H04R 1/1083 381/77 |
| 2012/0215519 A1* | 8/2012 | Park ...................... G06F 17/289 704/2 |
| 2012/0288126 A1* | 11/2012 | Karkkainen ........... H04R 3/005 381/309 |
| 2013/0009791 A1 | 1/2013 | Yoshioka et al. |
| 2013/0083938 A1* | 4/2013 | Bakalos ................ H04R 1/1083 381/71.8 |
| 2013/0188794 A1 | 7/2013 | Kawamata et al. |
| 2013/0223635 A1 | 8/2013 | Singer et al. |
| 2013/0273967 A1 | 10/2013 | Dave et al. |
| 2013/0275873 A1* | 10/2013 | Shaw .................... G01S 3/8006 715/716 |
| 2013/0301837 A1 | 11/2013 | Kim et al. |
| 2013/0328701 A1 | 12/2013 | Sato et al. |
| 2014/0029767 A1 | 1/2014 | Jarvinen et al. |
| 2014/0086423 A1* | 3/2014 | Domingo Yaguez .. H04R 3/005 381/58 |
| 2014/0203925 A1 | 7/2014 | Augst |
| 2014/0241532 A1 | 8/2014 | Sato et al. |
| 2014/0254830 A1 | 9/2014 | Tomono et al. |
| 2014/0270200 A1 | 9/2014 | Usher et al. |
| 2014/0380075 A1 | 12/2014 | Pulapaka et al. |
| 2015/0071457 A1 | 3/2015 | Burciu |
| 2015/0104049 A1 | 4/2015 | Noda et al. |
| 2015/0170645 A1* | 6/2015 | Di Censo ................ G10L 15/22 704/275 |
| 2015/0304761 A1 | 10/2015 | Montazemi et al. |
| 2017/0195818 A1 | 7/2017 | Di Censo et al. |

OTHER PUBLICATIONS

Basu et al., "Smart Headphones". Proceedings of CHI 2001 Extended Abstracts on Human Factors in Computing Systems, pp. 267-268, Seattle WA.

Mueller et al., "Transparent Hearing", Proceedings of CHI 2002 Extended Abstracts on Human Factors in Computer Systems, pp. 730-731, Minneapolis, MN.

U.S. Appl. No. 14/106,369 entitled "Name-Sensitive Listening Device", filed Dec. 13, 2013.

U.S. Appl. No. 14/059,359 entitled "Modifying an Audio Panorama to Indicate the Presence of Danger or Other Events of Interest", filed Oct. 21, 2013.

Partial European Search Report for application No. 19179356.1 dated Oct. 8, 2019.

* cited by examiner

| Region | Sound to Modify? | Angular Range |
|---|---|---|
| 1 | No | 0-45 |
| 2 | No | 45-90 |
| 3 | No | 90-135 |
| 4 | Yes | 135-180 |
| 5 | Yes | 180-225 |
| 6 | No | 225-270 |
| 7 | No | 270-315 |
| 8 | No | 315-0 |

DIRECTIONAL SOUND MODIFICATION

CROSS-REFERENCE TO RELATED APPLICATIONS

This application is a continuation-in-part of the co-pending U.S. Patent Application titled "DIRECTIONAL SOUND MODIFICATION," filed on Mar. 20, 2017, and having Ser. No. 15/464,172, which is a continuation of the U.S. Patent Application titled "DIRECTIONAL SOUND MODIFICATION," filed on Dec. 8, 2014, and having Ser. No. 14/563,458, now U.S. Pat. No. 9,622,013. The subject matter of these related applications are hereby incorporated herein by reference in their entirety.

BACKGROUND

Field of the Various Embodiments

Embodiments disclosed herein relate to sound modification and, in particular, generating audio signals to produce desired sound modification for one or more selected directions within an environment.

Description of the Related Art

Individuals conventionally wear noise-cancelling or noise-attenuating headphones in busy or noisy environments in order to work without distraction. Common types of headphones include in-ear headphones (or "ear buds"), on-ear headphones, and over-the-ear headphones.

In many cases, headphones generally provide a degree of passive noise attenuation by fully or partially obstructing the ear canal of the wearer. Additionally, some headphones provide active noise attenuation by generating sound waves that cancel sounds within the environment. Such headphones are typically configured to attenuate environmental noises that fall within a selected portion of the audible frequency spectrum.

One drawback of these conventional approaches is that, by canceling sound in the environment, the user is isolated from sounds in the surrounding environment. When the user is isolated from sounds in the surrounding environment, the user can miss sounds that may be of interest to the user, such as speech from other people (e.g., announcements at an airport, someone calling for the user). In order to be able to hear these sounds of interest, the user would have to remove the headphones entirely or disable active noise attenuation, which may expose the user to undesirable noise and detract from the overall enjoyment of the headphones.

As the foregoing illustrates, what is needed are more effective techniques for noise attenuation.

SUMMARY

One embodiment sets forth a method for directional sound modification. The method includes determining a direction within the environment, generating an audio signal based on sound acquired from the direction within the environment, and transmitting the audio signal to at least one audio output device to generate audio output. The audio output combines with sound from the direction within the environment to produce a modified sound.

Further embodiments provide, among other things, a system and a non-transitory computer readable storage medium configured to implement the method set forth above.

At least one advantage and technological improvement of the disclosed technique is that target directions for sound modification may be automatically determined with little or no user interaction. Accordingly, unwanted noise in the environment can be reduced or eliminated while still enabling the user to hear sounds of interest that originate from other directions in the environment.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the present disclosure may be practiced without one or more of these specific details.

Embodiments disclosed herein include a sound modification system that includes one or more audio sensors arranged to detect sounds within an environment and one or more audio output devices. The sound modification system further includes a processing device coupled with the audio sensors and audio output devices, wherein the processing devices operates to generate an audio signal based on sounds detected from within one or more selected directions within the environment, and to output the generated audio signal using the one or more audio output devices. The output generated audio signal combines with the detected sounds to produce a desired sound modification. In various embodiments, the sound modification system includes a location device that gathers location information and/or a sensor device that gathers visual information. The processing device may further operate to select one or more directions within the environment based on the location information, visual information and/or the sounds detected within the environment. The processing device may then generate an audio signal based on sounds detected from within the selected directions.

The sound modification system may be implemented in various forms of audio-based systems, such as personal headphones, home stereo systems, car stereo systems, etc. The sound modification system may selectively provide noise attenuation, amplification, or any other desired audio effects for modifying detected sounds. The sound modification system may perform its processing functions using a dedicated processing device and/or a separate computing device such as a user's mobile computing device or a cloud computing system. The sound modification system may detect sounds from the environment using any number of audio sensors, which may be attached to or integrated with other system components or disposed separately. The detected sounds, location information, visual information, and selected directions may be used to generate a two-dimensional (2D) or three-dimensional (3D) map of the environment, and the processing device may update the map based on changes to user orientation, user location, visual information, and detected sounds, as well as changes in relative distance between a user and various noise sources.

Figure 1A:
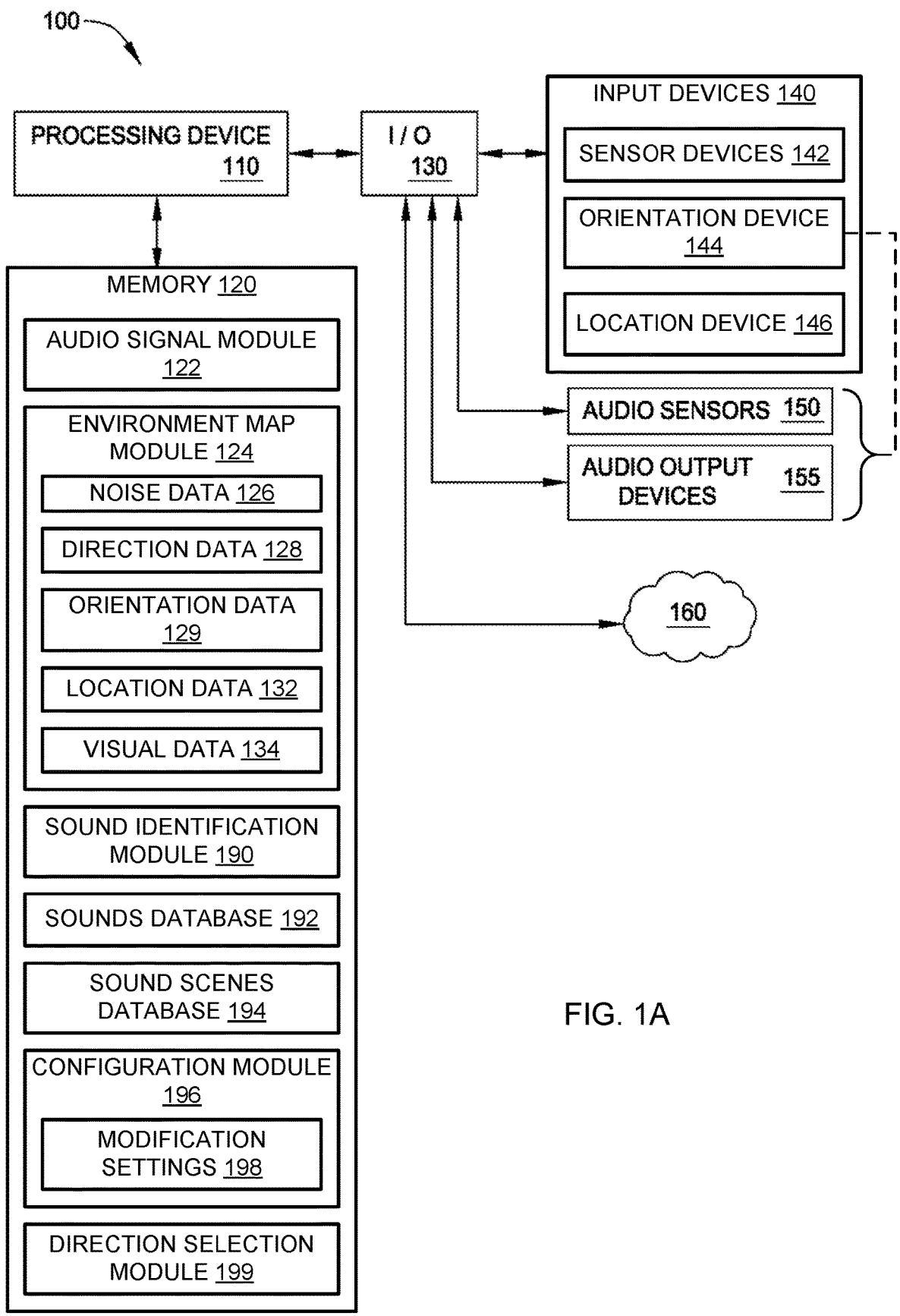
FIGS. 1A and 1B illustrate sound modification systems, according to various embodiments.
Figure 1B:
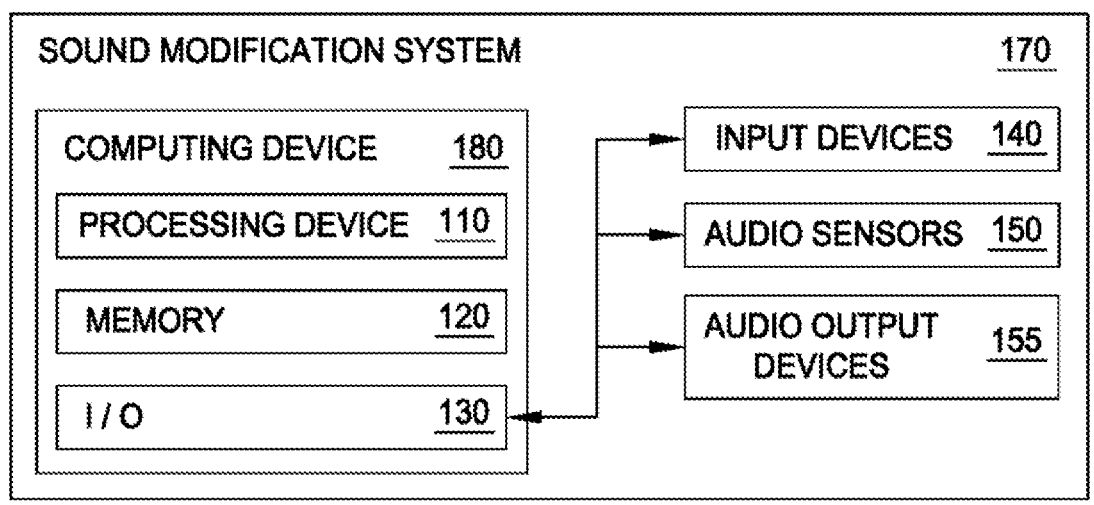

FIGS. 1A and 1B illustrate sound modification systems, according to various embodiments. As shown, sound modification system 100 includes a processing device 110, memory 120, input/output (I/O) 130, input device 140, audio sensors 150, and audio output devices 155. The processing device 110 may include any processing element capable of performing the functions described herein. While depicted as a single element within sound modification system 100, processing device 110 is intended to represent a single processor, multiple processors, a processor or processors having multiple cores, as well as combinations thereof. Memory 120 may include a variety of computer readable media selected for their size, relative performance, or other capabilities: volatile and/or non-volatile media, removable and/or non-removable media, etc. Memory 120 may include cache, random access memory (RAM), storage, etc. Memory 120 may include one or more discrete memory modules, such as dynamic RAM (DRAM) dual inline memory modules (DIMMs). Of course, various memory chips, bandwidths, and form factors may alternately be selected. Storage included as part of memory 120 may typically provide a non-volatile memory for the sound modification system 100, and may include one or more different storage elements such as Flash memory, a hard disk drive, a solid state drive, an optical storage device, and/or a magnetic storage device.

Memory 120 may include one or more modules for performing functions described herein. In various embodiments, any of the modules and/or applications included in memory 120 may be implemented locally by the sound modification system 100 and/or may be implemented via a cloud-based architecture. For example, any of the modules and/or applications included in memory 120 may be executed on a remote device (e.g., smartphone, a server system, a cloud computing platform, etc.) that communicates with sound modification system 100 via I/O 130 or network 160.

As shown, memory 120 includes an audio signal module 122 for generating audio signals to provide desired sound modifications for various selected directions, and an environmental map module 124 for creating a 2-dimensional (2D) or 3-dimensional (3D) mapping of noise sources and sound scenes within the environment. Audio signal module 122 may generally produce audio signals in the form of a scaled and possibly inverted copy of detected sounds, but may also generate other waveforms in order to produce the desired sound modification. For example, the audio signal module 122 might generate periodic audio signals or even random noise. The environmental map module 124 may separately include noise data 126 that reflects input from audio sensors 150, direction data 128 that reflects directions for sound modification (whether originally selected directions or updated) within the environment, and orientation data 129 that reflects the relative orientation of at least one of the audio sensors 150, audio output devices 155, and a user of the sound modification system 100. The environmental map module 124 may further include location data 132, received by location device 146, that reflects a geographic location of the least one of the audio sensors 150, audio output devices 155, and a user of the sound modification system 100. The environmental map module 124 may further include visual data 134 that reflects visual information, captured by a sensor device 142 (e.g., a visual sensor), of the vicinity of at least one of the audio sensors 150, audio output devices 155, and a user of the sound modification system 100.

In various embodiments, memory 120 further includes a sound identification module 190, a sounds database 192, a sound scenes database 194, a configuration module 196, and a direction selection module 199. The sound identification module 190 identifies detected sounds and/or identifies sound scenes based on detected sounds. The sounds database 192 includes samples and/or signatures of individual sounds for use in the identification of detected sounds by the sound identification module 190. The sound scenes database 194 includes samples and/or signatures of sound scenes for use in the identification of sound scenes by the sound identification module 190. The configuration module 196 performs processes for configuring one or more settings and/or parameters (e.g., modification settings 198) of the sound modification system 100, and performs processes for training the sound identification module 190 for identification of certain sounds and sound scenes. In some embodiments, the configuration module 196 may separately include modification settings 198 that store data reflecting settings and/or parameters for sound modification. In some further embodiments, modification settings 198 may be stored separately from configuration module 196. The direction selection module 199 selects one or more directions as target directions for sound modification.

In some embodiments, sounds database 192 includes samples and/or signatures of sounds of various types. For example, sounds database 192 could include samples and/or signatures of sounds of cars, construction equipment, jackhammers, crying, human voices, and so forth. Similarly, sound scenes database 194 includes samples and/or signatures of sound scenes of various types. In various embodiments, a sound scene is an aggregation of sounds of one or more types associated with a certain setting. For example, a traffic sound scene could be an aggregation of sounds associated with street and/or highway traffic, such as sounds of cars travelling on a road, sounds of car horns, and so forth. As another example, a building construction sound scene could be an aggregation of sounds (e.g., cranes, demolition machines, earth moving equipment, etc.) associated with building construction sites. As a further example, a road work sound scene could be an aggregation of sounds (e.g., jackhammers, road paving equipment, etc.) associated with road work and road construction. As yet another example, a crowd sound scene could be an aggregation of sounds (e.g., people in a crowd) associated with crowds. Accordingly, sound scenes database 194 could include samples and/or signatures of traffic sound scenes, building construction sound scenes, road work sound scenes, crowd sound scenes, and so forth. In some embodiments, the sounds database 192 and sound scenes database 194 may include training data used in conjunction with a machine learning technique (e.g., neural network, Bayesian network, etc.).

The processing device 110 may communicate with other devices, such as peripheral devices or other networked computing devices, using input/output (I/O) 130. I/O 130 may include any number of different I/O adapters or interfaces used to provide the functions described herein. I/O 130 may include wired and/or wireless connections, and may use various formats or protocols. In one example, the processing device 110 through I/O 130 may determine selected directions for sound modification using input devices 140 that are connected using a wireless connection, such as Bluetooth® (a registered trademark of the Bluetooth Special Interest Group) or Wi-Fi® (a registered trademark of the Wi-Fi Alliance), may detect environmental sounds using audio sensors 150 over wired connections, and may provide appropriate audio signals to audio output devices 155 over a separate wired or wireless connection to produce a desired sound modification for the detected sounds in the selected directions. In another example, the processing device 110 may, via I/O 130, determine selected directions for sound modification using location data obtained from a computing device (e.g., a smartphone) that is connected using a wireless connection, such as Bluetooth or Wi-Fi. In a further example, the processing device 110 may, via I/O 130, obtain modification settings 198 for storage in memory 120 based on a configuration procedure performed at a computing device (e.g., a smartphone) that is connected using a wireless connection.

I/O 130 may also include network interfaces that couple the processing device 110 to one or more networked computing devices through a network 160. Examples of networked computing devices include a server, a desktop computer, a mobile computing device such as a smartphone or tablet computer, and a worn device such as a watch or headphones or a head-mounted display device. Of course, other types of computing devices may also be networked with processing device 110. Network 160 may include one or more networks of various types, including a local area or local access network (LAN), a general wide area network (WAN), and/or a public network (e.g., the Internet). In some embodiments, the networked computing devices may be used as input devices 140, audio sensors 150, and/or audio output devices 155.

Input devices 140 are coupled with the processing device 110 and provide various inputs to the processing device 110 for performing directional sound modification. As shown, input devices 140 include sensor devices 142, an orientation device 144, and a location device 146. Sensor devices 142 may be provided to capture input from users of the sound modification system 100, and may include one or more types of sensors. For example, a user's input to select directions for sound modification may include gestures, such as various movements or orientations of the hands, arms, eyes, or other parts of the body. To detect user's input, sensor devices 142 may include visual sensors such as infrared (IR) sensors, thermal sensors, and/or imaging devices such as a charge-coupled device (CCD) or complementary metal-oxide-semiconductor (CMOS) sensor device. Sensor devices 142 may also include inertial sensors, such as a gyroscope or accelerometer. Sensor devices 142 may be worn or carried by the user, or may be disposed separately (i.e., existing as, or included with, a separate device). Of course, other types of sensor devices may also be included in sensor devices 142 to perform the various functions of receiving user input, which may include capacitive sensors, infrared sensors, magnetic sensors, sonar sensors, radar sensors, LIDAR sensors, neural sensors, and so forth.

In some embodiments, input devices 140 may include a user interface to receive user selection of directions for sound modification and/or to receive other user inputs, such as user inputs of one or more sound modification settings 198 during a configuration procedure. The user interface may take any feasible form for providing the functions described herein, such as one or more buttons, toggles, sliders, dials, knobs, etc., or as a graphical user interface (GUI). The GUI may be provided through any component of the sound modification system 100. In one embodiment, the GUI may be provided by a separate computing device that is communicatively coupled with the processing device 110, such as through an application running on a user's mobile or wearable computing device. To provide preferential selection of sound modification and/or sound modification settings, the user interface may allow user input for various parameters such as direction(s), type, and amount of sound modification to be performed, as well as types of sounds and sound scenes to target for sound modification. The parameters may be updated by the user or may be automatically updated during operation.

In another example, the user interface may receive verbal commands for selecting directions and other sound modification settings and parameters. In this case, input devices 140 may include one or more audio sensors, which may be different or the same as the audio sensors 150. The processing device 110 may perform speech recognition on the received verbal commands and/or compare the verbal commands against commands stored in memory 120. After verifying the received verbal commands, the processing device 110 may carry out the commanded function for the sound modification system (for example, altering sound modification parameters to specified levels).

Orientation device 144 provides information about the orientation of the audio sensors, audio output devices, and/or a user relative to the environment (and more specifically, relative to noise sources within the environment). The orientation device may provide two-dimensional (2D) or three-dimensional (3D) orientation data to the processing device 110, which may integrate the orientation data into maps of the noise environment. Orientation device 144 may include one or more sensor devices capable of detecting user orientation, such as a magnetometer, gyroscope, accelerometer, or imaging device. Orientation device 144 may be worn by the user or may be disposed separately.

Location device 146 provides information about the geographic location of the audio sensors, audio output devices, and/or a user relative to the environment (e.g., relative to noise sources within the environment). The location device 146 may provide location data (e.g., latitude and longitude coordinates) to the processing device 110, which may integrate the location data into geographic maps and/or maps of the noise environment. Location device 146 may include one or more sensor devices capable of detecting user location, such as a GPS receiver module. Location device 146 may be worn by the user or may be disposed separately. In some embodiments, location data of other forms may also be obtained from other sources. For example, the sound modification system 100 may communicate with location beacons via I/O 130 and obtain location data from these location beacons. As another example, the sound modification system 100 may communicate with a Wi-Fi network within networks 160 and obtain location data from the Wi-Fi network.

Audio sensors 150 are included to capture sounds occurring in the environment. The captured sounds may be used by the processing device to generate appropriate directional sound modification. The audio sensors may be a plurality of microphones or other transducers or sensors capable of converting sound waves into an electrical signal. The audio sensors may include an array of sensors that includes sensors of a single type, or a variety of different sensors. Audio sensors 150 may be worn by a user, or disposed separately at a fixed location or movable. The audio sensors may be disposed in any feasible manner in the environment. In several embodiments, the audio sensors 150 are generally oriented outward relative to audio output devices 155, which are generally disposed inward of the audio sensors 150 and also oriented inward. Such an orientation may be particularly beneficial for isolating one or more regions for which sound modification is to be performed (i.e., using output from the audio output devices 155) from the rest of the environment. In one example, the audio sensors 150 may be oriented radially outward from a user, while the audio output devices 155 are oriented radially inward toward the user.

Audio output devices 155 are included to output generated audio signals to provide appropriate sound modification corresponding to one or more selected directions within the environment. Of course, the sound modification audio signals may be simultaneously driven on the audio output devices 155 with other audio signals (e.g., music or other audio playback). The audio output devices may use conventional audio output techniques, such as loudspeakers or other suitable electroacoustic devices. Audio output devices 155 may be implemented using any number of different conventional form factors, such as discrete loudspeaker devices, around-the-ear (circumaural), on-ear (supraaural), or in-ear headphones, hearing aids, wired or wireless headsets, body-worn (head, shoulder, arm, etc.) listening devices, body-worn close-range directional speakers or speaker arrays, body-worn ultrasonic speaker arrays, and so forth. The audio output devices 155 may be worn by a user or disposed separately at a fixed location or movable. As discussed above, the audio output devices 155 may be disposed inward of the audio sensors 150 and oriented inward toward a particular region or user.

FIG. 1A shows one embodiment in which various components of the sound modification system 100 may be distributed across several devices. FIG. 1B shows another embodiment in which computing components (e.g., processing device 110, memory 120, and I/O 130) of sound modification system 170 are included in a discrete computing device 180. Generally, the computing device 180 receives input from the one or more input devices 140 and audio sensors 150, generates the audio signals for directional sound modification, and outputs the generated audio signals using audio output devices 155. As will be seen below, computing device 180 may be disposed in relative proximity to the audio sensors 150 and audio output devices 155.

Figure 2A:
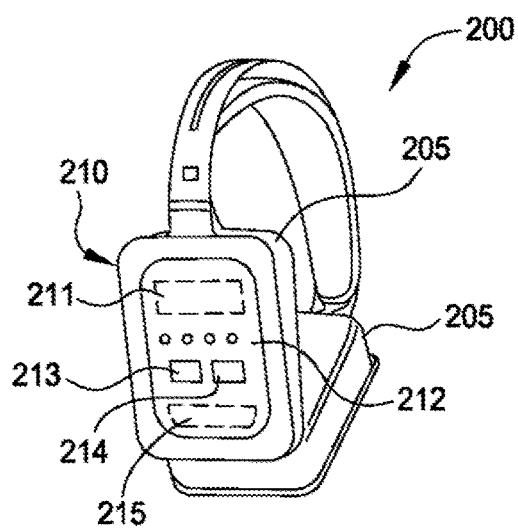
FIGS. 2A-2F illustrate sound modification systems deployed within different environments, according to various embodiments.

FIGS. 2A-2F illustrate sound modification systems deployed within different environments, according to various embodiments. FIG. 2A illustrates the sound modification system implemented in over-the-ear headphones 200, according to one embodiment. The headphones 200 include ear cups 205 that are provided to comfortably interface with a user's head and to cover the user's ears. The headphones 200 also include a housing 210 that connects to each ear cup 205, providing support to the ear cups, the speaker elements, as well as any other components included in the headphones 200. As shown, the headphones 200 include a processing module 211, a plurality of microphones 212, one or more buttons 213, a feedback device 214, and a power source 215. Of course, the person of ordinary skill in the art will recognize that other components, though not explicitly mentioned here, may also be included in headphones 200.

At a minimum, processing module 211 includes ability to receive audio signals through a wired or a wireless connection and to output the audio signal to the speaker elements of the headphones 200. Processing module 211 may also include one or more active or passive devices for modulating the received audio signals. Processing module 211 may include the processing device 110 along with other functionality described above with respect to the sound modification systems 100, 170 (e.g., sensor devices 142, orientation device 144) to provide directional sound modification within the environment. In one embodiment, the processing module 211 may be the computing device 180. Additionally, processing module 211 may be coupled with one or more separate computing devices that provide the sound modification audio signals, and optionally provide media to be output to the speaker elements of the headphones 200. The computing device may be a mobile or worn computing device of the user, such as a laptop, smartphone, tablet, smartwatch, etc.

The microphones 212 may be used as the audio sensors 150 and preferentially disposed in a particular arrangement. For example, an array of microphones 212 may be distributed along the width of the housing 210 and oriented outward to capture noise occurring in the environment outside the worn headphones. In one example, the microphones may be oriented radially outward, by following a curved outer surface of the housing 210 and/or by being individually oriented. Of course, the microphones may be preferentially distributed along one or more dimensions or surfaces to provide a sound-capturing panorama of a desired shape and size. In one embodiment, the array of microphones may include one or more microelectromechanical systems (MEMS) devices, each MEMS device including a plurality of smaller transducers. The plurality of transducers may be spatially separated so that the directionality of the sound events can be determined through arrival timing differences. The signals received from the transducers may then be processed and examined for intensity, spectral, and timing cues to allow localization of sound sources.

The one or more buttons 213 may be used as an input device 140 for selecting one or more directions within the environment for performing sound modification. The buttons 213 may be disposed on the housing 210, such as one or more buttons on the portions of housing 210 connected to each ear cup 205. The buttons 213 may be disposed similarly to the microphones 212 with each button corresponding specifically to one or more of the microphones 212. In one embodiment, the buttons and microphones correspond in a 1:1 ratio. For example, pressing a button may toggle whether or not sound modification is being performed on the sounds detected by the corresponding one or more microphones, or may change sound modification settings (e.g., change the amount of amplification or attenuation). In one embodiment, the buttons 213 may be provided to cycle through a plurality of predetermined settings for sound modification, whether set by default or user-specified. In one embodiment, the buttons 213 may be used as a trigger device for other inputs. For example, the user may press a button and subsequently input a verbal command or make a particular input gesture to select directions or other sound modification parameters.

Feedback device 214 may be included to provide visual or haptic feedback to a user. For example, feedback device 214 may include one or more light emitting diodes (LEDs) or vibrating motors. In one embodiment, the LEDs may be disposed similarly to the microphones 212 and/or buttons 213, and may indicate the selected directions for performing sound modification. The feedback device may also acknowledge a successful user selection, e.g., by blinking or vibrating.

Power source 215 may be coupled with the processing module 211 and feedback device 214 to provide power to each component. Power source 215 may include replaceable or rechargeable batteries or other energy storage devices. Power source 215 may also include a connection to wall power for powering the components and/or recharging the batteries.

Figure 2B:
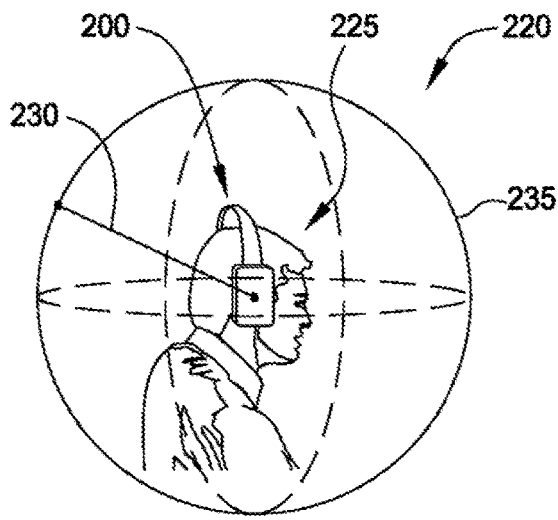

FIG. 2B illustrates an example environment 220, in which the over-the-ear headphones 200 are worn by a user 225, according to one embodiment. Based on intrinsic properties of the microphones and their relative dispositions within headphones 200, the various microphones are each capable of sensing a minimum threshold level of sound, which may correspond to a particular distance 230 from the microphone. In combination, the composite sensing regions of the various microphones may form an audio sensing zone 235, which is represented by a spatial area or volume extending from the microphones into the ambient environment. The audio sensing zone 235 may have various shapes and/or sizes depending on the number, positioning, and orientation of the microphones, as well as each microphone's capability (e.g., sensitivity, frequency response, etc.). In the simplified example depicted here, audio sensing zone 235 is represented by a sphere surrounding the head of user 225. Of course, more complex shapes are possible and expected, such as elongated shapes, shapes that include overlapping areas of microphone coverage, or non-continuous shapes in which the microphones do not provide complete sound coverage. For any given device, such as headphones 200, the device may have differing audio sensing zones at different noise frequencies as the frequency-dependent properties of each microphone may be different.

As described here, the outer spatial limits of the audio sensing zone represent some predetermined minimum sound level (e.g., 3 decibels or dB). Of course, this does not require that a particular noise source be physically located within the space defined by the audio sensing zone, but only that the noise source generates sufficient power to meet or exceed the threshold sound level at the outer limit.

Figure 2C:
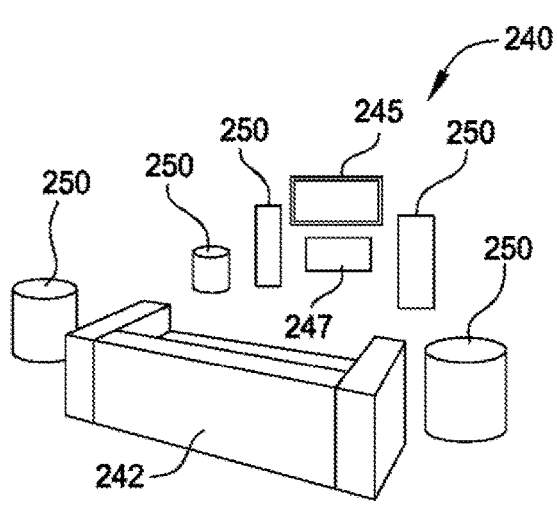

FIG. 2C illustrates another example environment 240 for a sound modification system, according to one embodiment. In this case, the sound modification system may be deployed in a home stereo system. The home stereo system may include a television 245 or other audiovisual device, a stereo receiver 247, and a plurality of speakers 250. Each of the speakers 250 may include drivers corresponding to different frequency ranges (e.g., tweeters, woofers, subwoofers) and may be preferentially disposed within the environment 240 for audio quality. More specifically, the television 245 and speakers 250 may be disposed to provide optimal audio and video quality for one or more users at a predetermined location, e.g., seated on couch 242.

Figure 2D:
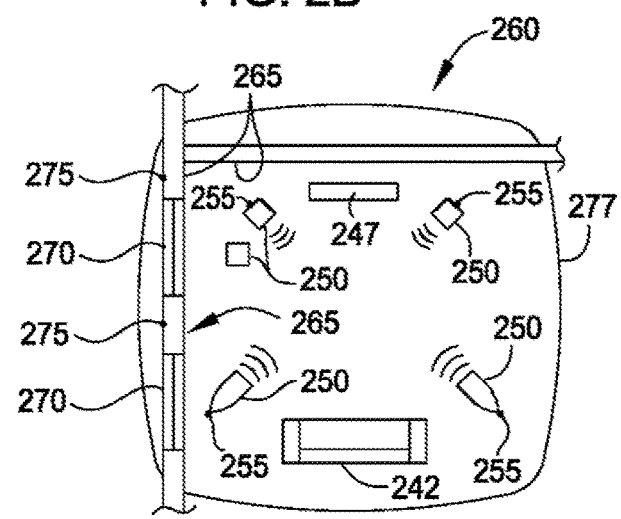

FIG. 2D illustrates a top view of environment 260, according to one embodiment. In large part, the environment 260 is the same as environment 240, but environment 260 explicitly depicts audio sensors and the corresponding audio sensing zone 277. One or more different types of audio sensors may be included in the environment 260. The audio sensors may be attached to, or integrated with, various components of the home stereo system, such as audio sensors 255 disposed on the speakers 250. Audio sensors may also be disposed separately, such as attached to a non-component of the home stereo system, or as a stand-alone sensor. Audio sensors 275 are attached to the exterior of walls 265 near windows 270, and may be used to modify outdoor noise (e.g., animals, neighbors, automotive/train/air traffic, etc.). Processing for the sound modification system may be natively performed by the stereo receiver 247, or may be performed by a separate computing device which is also able to output audio signals to the various speakers 250. The computing device could be a computing system included with the home stereo system, or alternately may be a mobile computing device of the user, such as a laptop, smartphone, tablet, smartwatch, etc.

Figure 2E:
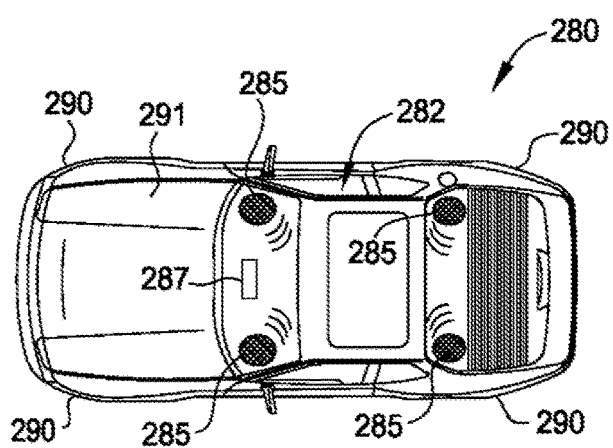

FIG. 2E illustrates a sound modification system as implemented in an automobile 280, according to one embodiment. As shown, automobile 280 includes a passenger compartment 282, in which a plurality of speakers 285 and an audio receiver 287 are located. The audio receiver 287 is coupled with the speakers 285 and generally operates to receive an audio input (AM/FM/satellite-based radio, compact disc, MP3 files, etc.) and to drive amplified and/or equalized audio signals to the speakers 285. The sound modification system may include a plurality of audio sensors 290 disposed on the exterior of the automobile 280 and oriented outward. Though four audio sensors are shown as disposed on the automobile's quarter panels, any number of sensors disposed in any interior or exterior location of the automobile are possible. In one embodiment, audio sensors may be disposed near the engine compartment 291 (such as between the engine compartment and the passenger compartment 282) in order to preferentially modify engine sounds (e.g., attenuate or amplify). Processing for the sound modification system may be natively performed by the audio receiver 287, or may be performed by a separate computing device which is also able to output audio signals to the various speakers 285. Again, the computing device could be a computing system included with the audio system, or alternately may be a mobile computing device of the user, such as a laptop, smartphone, tablet, smartwatch, etc.

Figure 2F:
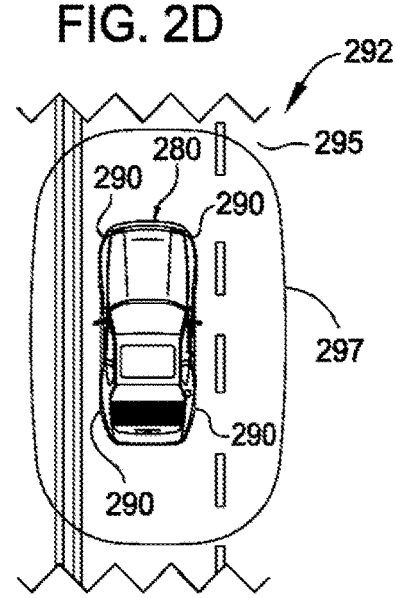

FIG. 2F illustrates environment 292, in which the automobile 280 is operating along road 295. As with other embodiments described above, the sensors 290 of the sound modification system correspond to an audio sensing zone 297. As environmental noises are detected by sensors 290, the sound modification system may generate audio signals to provide the desired modification effect for sounds coming from selected directions.

Figure 3:
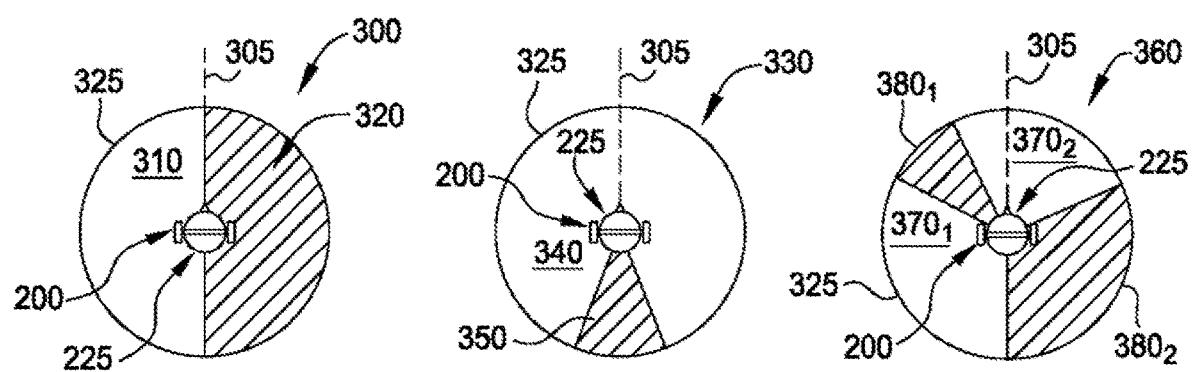
FIG. 3 illustrates selection of directions for sound modification within an environment, according to one embodiment.

FIG. 3 illustrates the selection of directions for sound modification within an environment, according to one embodiment. Although one particular embodiment including headphones is depicted, the person of ordinary skill will understand that various alternative implementations are also possible. Environment 300 provides a top-down depiction of a user 225 wearing headphones 200 on his or her head. The user 225 has an initial orientation 305 within the environment 300. Though a simplified 2D representation of the user orientation and the environment is presented here, the person of ordinary skill will understand that the same principles would also apply to a 3D representation (e.g., capturing whether the user is leaning head forward, back, to the left or right side, etc.). An audio sensing zone 325 representing the composite sensing regions of the various microphones included with the headphones 200 extends from the microphones into the ambient environment. Sounds detected by headphones 200 as coming from pass-through area 310 within the audio sensing zone 325 are permitted to pass through to the user without applying an active sound modification. Sounds detected as coming from modification area 320 within the audio sensing zone 325, however, are combined with generated audio signals to produce a desired sound modification.

A user may select the direction(s) for sound modification using any number of methods. In the simplified case shown in environment 300, the user might select an entire side 320 to be attenuated or amplified (e.g., corresponding to one of the ear cups of the headphones 200). Alternatively, the user might specify an angle and angular width (say a center angle of 90° from the current orientation 305, with a 180° width), or multiple angles (from 0°-180°).

As discussed above, the user may be able to provide this direction selection input through the use of pushbuttons, verbal commands, gestures, using a GUI, etc. In one embodiment, each side of headphones 200 may include one or more buttons, so that user 225 may selectively apply sound modification for one or more directions merely by pressing corresponding buttons. In another embodiment, the user may provide verbal commands for selecting the one or more directions, by selecting the angles directly or indirectly (e.g., using words or phrases that are pre-mapped to certain angles). In another embodiment, the user may provide gestures in which the angles may be selected directly or indirectly. For example, a user could point to first and second angles defining the modification area 320, or could point at an object (e.g., a particular noise source). In one embodiment, the orientation of the user's eyes may be determined in conjunction with selecting the one or more directions, so that by simply looking at a sound source the direction may be determined. In this case, the direction may be determined based on the user's gaze after triggering the selection by speaking a verbal command, pressing a button, etc. The sound modification system may receive the user's input and set appropriate angles so that the object is completely included within modification area 320.

Along with selecting directions for sound modification, the user 225 may also specify the type and amount of modification (e.g., amplification, attenuation, and amounts of either). For example, a user might point to a noise source and say, "reduce this noise by 50%" or "reduce any noises from this direction by 3 dB." In another example, a user wearing headphones who wants to be made aware when a coworker approaches his or her office might point to the open office door and say, "increase sounds coming from this direction by 35%." The type and amount of sound modification may vary for different modification areas. In addition to directions, a user may also specify that certain frequency ranges are to be modified. The user may specify these by indicating specific frequency values or by selecting pre-mapped frequency ranges (corresponding to speech, automobile traffic, or other common noise source ranges). The modification areas specified by the user (such as modification area 320) may track the user's orientation, or may remain fixed despite changes to the user's orientation. For example, the user may select all sounds from his or her right side to be sound modified. If the corresponding modification area is set to track the user, the sounds coming from the user's right side at any instant (even if the user has moved) will continue to be sound modified.

In some embodiments, input from one or more sensors may be correlated with various sound sources to determine which sounds are most disruptive for a user. The disruption determination may be based on a temporal comparison of sensor measurements against various sounds in the environment. Example sensor measurements include brain activity to determine a loss of focus or concentration (e.g., using neural sensors) or detecting eye or head movement (e.g., a larger movement may generally correlate to a disruption). Based on the disruption determination, when audio sensors detect sounds that meet criteria sufficiently similar to the disruptive sounds, directions for sound modification may be determined and applied automatically for these sounds.

As discussed above, the sound modification systems may generate mappings of the environment to reflect detected noise and the one or more selected directions for sound modification. The sound modification systems may transform the mappings according to the user's current location and orientation before generating the audio signals for sound modification. A 2D version of the map may be similar in appearance to the depictions of FIG. 3. Whereas the modification areas of the 2D map are generally represented as wedges projecting from the user (or from one or more microphones), a 3D map might include various vectors projecting from the user or microphones, which in 3D space might be conical or appear cone-like.

As a part of generating the environmental maps, the sound modification systems may also estimate discrete noise source locations for the detected sounds, and may plot those estimated locations in the maps. The maps may use any known coordinate systems, such as Cartesian, polar, or spherical coordinates. These maps may further be linked to an absolute position of the user (provided via sensor devices, such as a Global Positioning System (GPS) sensor). When linked to an absolute position, the maps may be useful for other users of sound modification systems. For example, noise maps that are generated while a headphone-wearing user walks down a busy road could be stored to a server and later provided to other users in that vicinity, which might decrease or prevent redundant processing by the various sound modification systems.

Environment 330 also provides a top-down depiction of the user 225 wearing headphones 200 on his or her head. User 225 has same orientation 305, but in this example wishes to specify different directions for the modification area 350 (in this case, the area is located behind the user). The user 225 setting one or more modification areas 350 may also operate to define one or more pass-through areas 340 within the audio sensing zone 325. Again, the user may select the directions by specifying particular angles. In an alternate embodiment, the user may specify a direction or particular angle, along with a modifier to describe the relative width of the modification area 350 (e.g., "narrow," "moderate," "wide"). The modifiers may be pre-mapped to represent certain angular widths. In an alternate embodiment, the user may specify one angle (e.g., 180 degrees from current orientation, or "behind me") and a predetermined default angular width is applied to create the modification area 350. Of course, after initially setting the modification area 350, the user may select entirely new modification areas or may make incremental adjustments to the modification area 350. For example, the user may identify the modification area and provide specific angle or angular width changes, or may specify widening/narrowing the modification area and/or shifting the modification area relative to user orientation.

Environment 360 also provides a top-down depiction of the user 225 wearing headphones 200 on his or her head. User 225 has same orientation 305, but in this example wishes to specify directions for two different modification areas $380_1$, $380_2$. Setting the modification areas $380_1$, $380_2$ may also operate to define one or more pass-through areas $370_1$, $370_2$ within the audio sensing zone 325. The user may specify angles or ranges of angles for each modification area $380_1$, $380_2$, which may be selected simultaneously or at different times. As before, user may alternately use verbal descriptors to set the width of each modification area (for example, "a wide range centered at 135°, and a narrow range at 315°"). Alternatively, the user may specify an angle, and a predetermined default angular width is applied.

Figure 4:
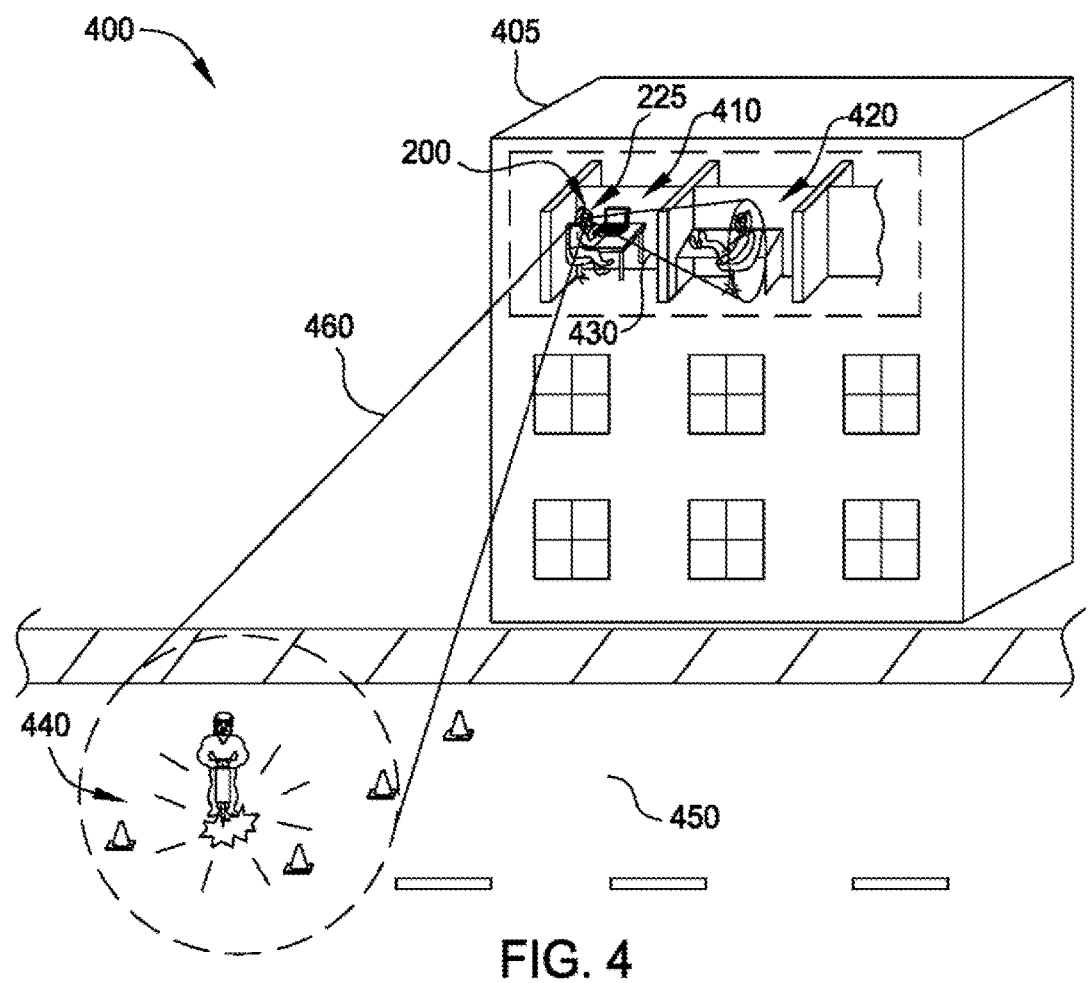
FIG. 4 illustrates operation of a sound modification system in a noisy environment, according to one embodiment.

FIG. 4 illustrates operation of a sound modification system deployed in a noisy environment, according to one embodiment. A multi-story office building 405 is depicted, in which user 225 is wearing headphones 200 while working at a workstation 410. A co-worker in an adjacent workstation 420 is talking loudly on a phone, which may be distracting to the user. Meanwhile, roadwork 440 is occurring on the street 450 outside the office building 405, also creating noise that may distract the user.

Using any of the various techniques described above, the user may select directions for noise modification corresponding to these noise sources. In this case, the user may desire to attenuate the noise sources. Although not shown, user may additionally or alternatively select one or more directions in which to enhance sound (e.g., amplify and/or equalize), such as from the directions of the user's computer or phone. After the user specifies the directions corresponding to the noise sources, the sound modification system may determine the loudest noise source(s) within a predetermined range of the specified directions, as the user may not have provided a precise indication of the directions, and as it is likely that the loudest noises coming from the selected directions are what the user seeks to modify. A 3D mapping of the environment 400 may thus include vectors 430 and 460 projecting from the user 225 (or rather, the corresponding microphones included in headphones 200). The vectors 430, 460 indicate that sound modification will be performed for sounds detected as coming from the corresponding directions.

Figure 5:
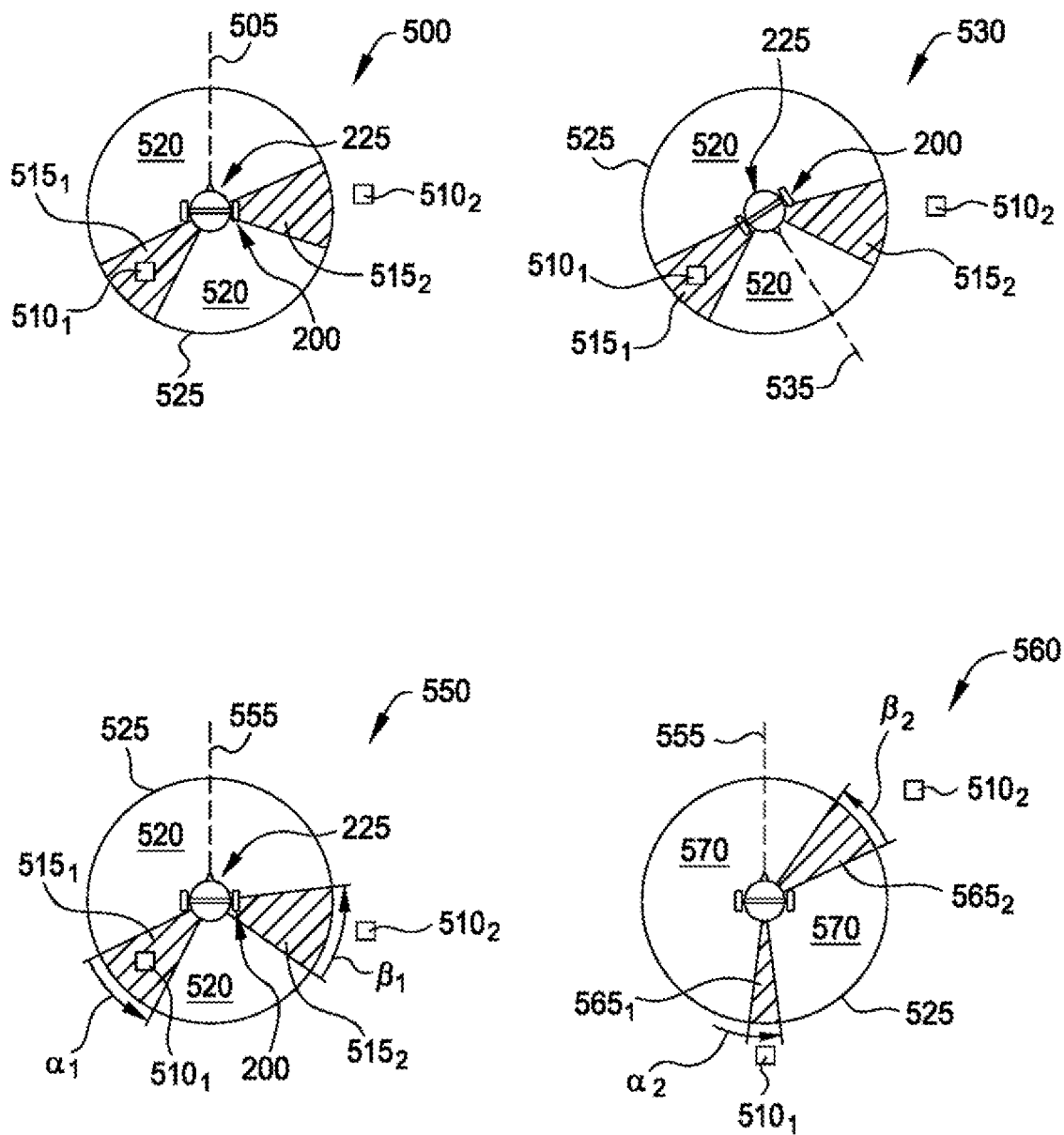
FIG. 5 illustrates updating selected directions for sound modification according to one embodiment.

FIG. 5 illustrates updating selected directions for sound modification, according to one embodiment. In environment 500, a user 225 is depicted as wearing headphones 200 on his or her head, while in an initial orientation 505. Two point noise sources $510_1$, $510_2$ are included in the environment 500. One noise source $510_1$ is disposed within the audio sensing zone 525 of the headphones 200, while the other noise source $510_2$ is disposed outside. Thus, sounds detected from directions corresponding to pass-through areas 520 are not sound-modified, while sounds from the modified areas $515_1$, $515_2$ are modified by the sound modification system. The sound modification system may generate a map of the environment 500 based on these selected directions and noise sources.

In environment 530, the user has turned his or her entire body (or perhaps just his/her head), such that orientation of the user (or of the audio sensors of headphones 200) changes from orientation 505 to orientation 535. In one embodiment, the sound modification system is configured to track the noise sources for changes in user orientation. Though the user has re-oriented, the noise sources $510_1$, $510_2$ remain in the same positions, and thus the modified areas $510_1$, $510_2$ remain static relative to the noise sources. No matter what changes to user orientation occur, the noise sources will continue to be sound modified. While the environments are shown in 2D for simplicity, the person of ordinary skill will understand that similar implementations may be made in 3D space.

In one embodiment, the sound modification system is configured to also track displacement of the user and/or the noise sources. This may be done in addition to tracking the noise sources for changes in user orientation. In environment 550, the user has an initial orientation 555. Again, two point noise sources $510_1$, $510_2$ are included. The modified area $515_1$ corresponding to noise source $510_1$ has an initial angular width $\alpha_1$, and modified area $515_2$ corresponding to noise source $510_2$ has an initial angular width $\beta_1$.

Figure 6:
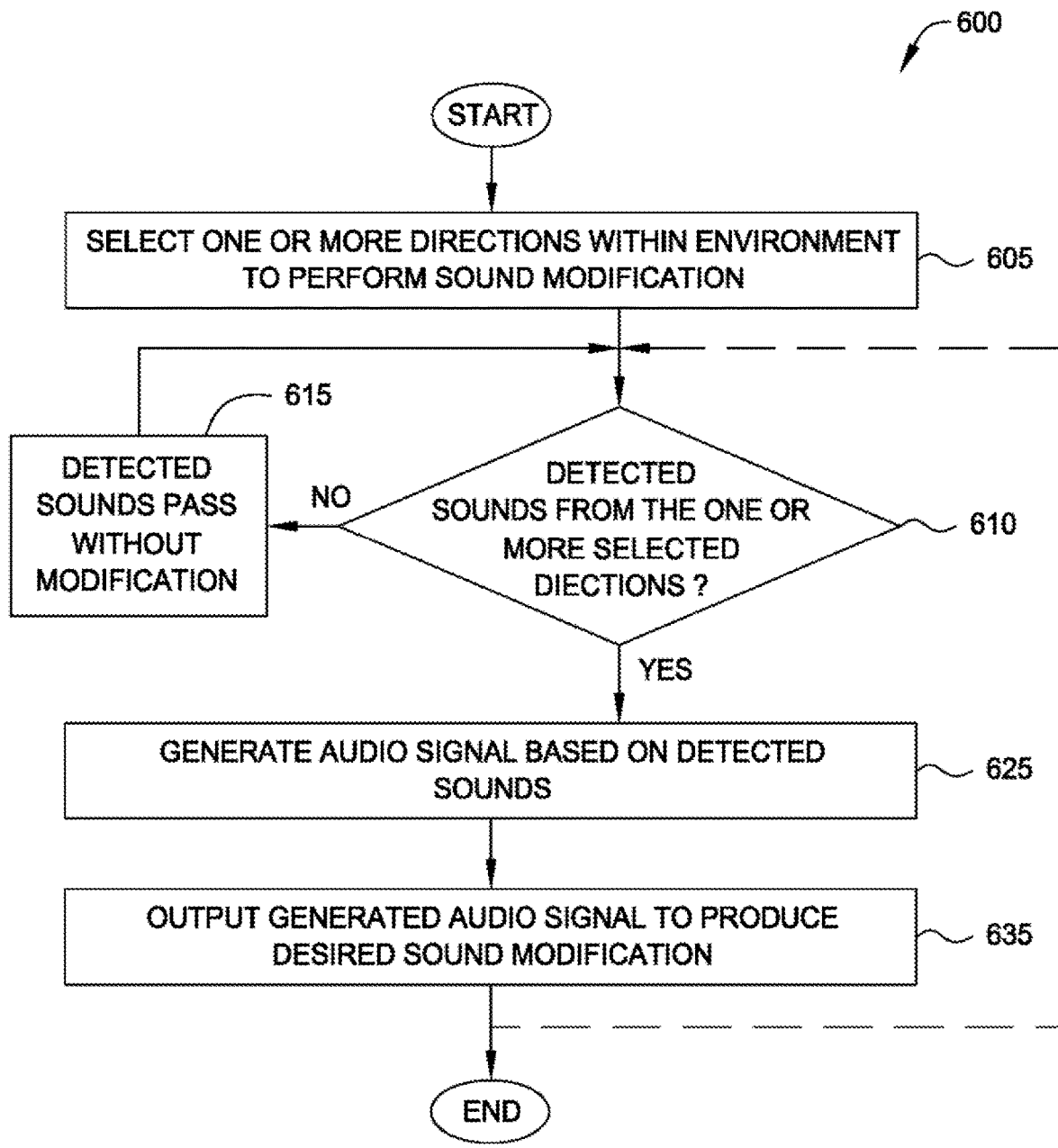
FIG. 6 illustrates a method for directional sound modification, according to one embodiment.

In environment 560, user maintains the same orientation 555 but a relative displacement occurs between the user and the two point noise sources $510_1$, $510_2$. For example, the user may be moving and/or one or both of the noise sources may be moving. Modification area $515_1$ has shifted relative to the user orientation and is now modification area $565_1$, and has a smaller angle $\alpha_2$ indicating an increase in distance between the user and the noise source $510_1$. Modification area $515_2$ has also shifted relative to the user orientation and is now modification area $565_2$, but has an angle $\beta_2$ that is approximately the same size as angle $\beta_1$ (indicating that the distance between the user and noise source is approximately the same). Corresponding pass-through areas 570 fill the remainder of the audio sensing zone 525, FIG. 6 illustrates a method for directional sound modification, according to one embodiment. The method 600 may be used consistent with descriptions of the various sound modification systems described above, and within the environments described in various embodiments. Method 600 may be performed using a processing device of a sound modification system, or using a separate computing device communicatively coupled with the sound modification system, or using a combination of various processing devices. For example, method 600 may be performed by an application executing on a user's mobile computing device communicatively coupled with the sound modification system.

Method 600 begins at block 605, where one or more directions within the environment are selected for performing sound modification. The directions may be selected by a user, as well as the type and amount of modification to perform on sounds coming from the selected directions. The selected directions may be included in a 2D or 3D map generated of the noise environment, and may form one or more modification areas that may selectively track user orientation, user displacement, and/or noise source displacement.

At block 610, the processing device determines whether sounds are detected as coming from the one or more selected directions by one or more audio sensors of the sound modification system. If no sounds are detected, or if any detected sounds are determined to come from pass-through areas falling outside the selected directions, the method proceeds to block 615 ("NO") and any detected sounds from the non-selected directions are permitted to pass through without providing active sound modification. The method may generally loop through block 610, whether continuously or at discrete time intervals, until detected sounds correspond to the one or more selected directions ("YES"), when the method proceeds to block 625.

At block 625, the processing device generates an audio signal based on the detected sounds corresponding to the one or more selected directions. The audio signal is also based on the desired sound modification specified by the user, such as attenuation or amplification of the detected sounds, and amounts of either. The audio signal may generally take the form of a scaled and possibly inverted copy of the detected sounds, but other waveforms may be used to generate the desired sound modification.

At block 635, the generated audio signal is output to produce the desired sound modification. This may include driving selected ones of the audio output devices with the output signal (for example, audio output devices whose orientations are most closely aligned with the selected directions). The method may end following block 635, or may return to block 610, whether as a continuous loop or at discrete time intervals.

Automatic Selection of Sound Modification Direction

As described above, conventional headphones may provide a degree of passive noise attenuation by fully or partially obstructing the ear canal of the wearer or otherwise isolating the ear canal of the wearer from the environment. Additionally, some conventional headphones provide active noise attenuation by generating sound waves that cancel sounds within the environment. However, these conventional approaches have several drawbacks. One such drawback is that, by canceling sound in the environment, the user is isolated from sounds in the surrounding environment. As a result, the user can miss sounds that may be of interest to the user.

To address these issues, in various embodiments, a sound modification system 100 (e.g., direction selection module 199) may select one or more target directions for sound modification automatically (e.g., without an explicit selection of a direction by a user). In some embodiments, the sound modification system 100 may determine possible directions for sound modification within the environment based on at least one of detected sounds, location information, and visual information.

In one example, using at least one of detected sounds, location information, and visual information, the sound modification system 100 identifies one or more sounds scenes in the environment and corresponding directions and/or angle ranges for the identified sound scene(s). Then, based on the identified sound scenes, the sound modification system 100 may select one or more directions within the environment for sound modification. The selection may be made in accordance with modification settings 198 specifying which sound scenes should be targeted for sound modification. The sound modification system 100 may then generate an audio signal based on the detected sounds in the selected direction(s) and output the audio signal to produce the desired sound modification.

In another example, using at least one of detected sounds, location information, and visual information, the sound modification system 100 may generate a two-dimensional (2D) or three-dimensional (3D) map of the environment and one or more sounds within the environment. Then, based on the map of the environment and the location(s) of sound(s) within the environment, the sound modification system 100 may select one or more directions within the environment for sound modification. The sound modification system 100 may then generate an audio signal based on the detected sounds in the selected direction(s) and output the audio signal to produce the desired sound modification.

FIGS. 7A-7D illustrate techniques for identifying sounds and sound scenes and selecting a direction for sound modification, according to various embodiments. As shown, a user 702 is in an initial orientation 704 within environment 700 while wearing headphones 200 on his or her head. Sound sources 706-1, 706-2, 706-3, 706-4, 708-1, 708-2, and 708-3 are included in the environment 700 as sources of sounds (e.g., noises, voices, etc.) in the environment 700. The sound sources may correspond to the actual sources of the sounds (e.g., an object or person generating the sound) or a reflection source of a sound (e.g., a wall reflecting the sound). It should be appreciated that, while FIGS. 7A-7D illustrate a sound modification system deployed in headphones 200, the embodiments illustrated and described herein are applicable to sound modification systems deployed in other forms as well.

In various embodiments, the sound modification system (e.g., headphones 200) may be configured (e.g., in an initial configuration process, in a process to modify the configuration) with one or more modification settings 198 for sound modification. For example, configuration module 196 may perform a configuration or setup procedure that directs the user to input the modification settings 198. The configuration or setup procedure may be performed at the sound modification system or at a connected computing device (e.g., via an app on a connected smartphone) and receive inputs from the user specifying the settings.

In various embodiments, modification settings 198 may include a sound blacklist that includes one or more types of sounds to target for modification (e.g., cars, crying, jackhammer, construction equipment, etc.). The modification settings 198 may also include, in addition to or alternatively, a sound scenes blacklist of one or more types of sound scenes to target for modification (e.g., traffic, construction sites, crowds, etc.). The blacklists may specify types of sound and/or types of sound scenes whose sounds a user of the sound modification system desires to modify. In some embodiments, the type of sound and/or type of sound source may be specified in terms of location (e.g., specifying that construction site locations, corresponding to construction sounds and/or sound scenes, are blacklisted; specifying that road work locations, corresponding to road work sounds and/or sound scenes, are blacklisted). The sound modification system selects directions that include sounds and/or sound scenes in the blacklist(s) to target for sound modification. The modification settings 198 may, in addition to the blacklist(s), include a whitelist of one or more modification exceptions to the sounds and/or sound scenes in the blacklists. For example, the whitelist could specify that emergency vehicle siren sounds should be passed through unmodified when modifying sounds from a traffic sound scene. In another example, the whitelist could specify that human voices should be passed through unmodified when modifying sounds from any sound scene. As a further example, the whitelist could specify that the voice of a specific person should be passed through unmodified when modifying any type of sound or sounds from any type of sound scene. Sounds included in a blacklist or whitelist may be identified via any of the techniques described herein, including, without limitation, based on sound samples, sound signatures, etc. included in sounds database 192.

In some embodiments, the modification settings 198 may also include angular width settings, which includes settings for one or more of: specific angular widths for sounds and/or sound scenes (e.g., starting angular widths for an identified sound and/or a sound scene) for a direction for sound modification, angle increments at which the angular width of a direction for sound modification may be increased or decreased (e.g., angle increment at which a direction for sound modification may be increased or decreased in angular size if a new sound is detected), and how narrow or wide the angular width of a direction for sound modification (e.g., tightly bound to the spread of the sound sources, or loosely bound with additional width surrounding the sound sources) are to be set.

Within environment 700, the sound modification system may, in various embodiments, detect the sounds from sound sources 706 and 708. The sound modification system may, in various embodiments, segment the sounds from the sound sources 706 and 708 into individual sounds and identify the types of sounds, thereby classifying the sound sources 706 and 708 by type of sound or type of source. The identification module 190 may obtain samples of the detected sounds and compare the sounds against samples or signatures in the sounds database 192 to identify the sounds. In some embodiments, the identification module 190 implements a machine learning technique (e.g., neural network, Bayesian network), with the sounds database 192 as the training data, to segment and identify the sounds.

The sound modification system may, in various embodiments, identify one or more sound scenes within environment 700 in addition to, or in lieu of, segmenting and identifying the sounds from the sound sources 706 and 708. The identification module 190 may obtain samples of the detected sounds and compare the sounds in the aggregate. For example, detected sounds could be compared in the aggregate (e.g., sound as captured by audio sensors 150 without processing to segment the sounds into individual sounds by type or source) to samples or signatures in the sound scenes database 194 to identify one or more sound scenes present in environment 700. In some embodiments, the identification module 190 operates a machine learning technique (e.g., neural network, Bayesian network), with the sound scenes database 194 as the training data, to identify the sound scenes.

The sound modification system may, additional or alternatively, collect location information and/or visual information from the environment 700. The location device 146 could obtain location data (e.g., latitude and longitude) identifying the geographic location of the user 702 and/or headphones 200. The sound modification system may correlate the location data with geographic map data (not shown) to identify one or more sound sources and/or sound scenes in environment 700. For example, the sound modification system could, based on the user's orientation 704 and the user's location on a sidewalk of a street, determine that a traffic sound scene is present on one side of the user 702. As another example, the sound modification system could, based on the user's location and orientation 704 being in proximity of a known construction or road work site in the geographic map data, determine that a construction sound scene or a road work sound scene, respectively, is present on one side of the user.

The sound modification system may process visual data (e.g., images, LIDAR data) captured by sensor device 142 using any suitable image recognition technique to identify landmarks and/or objects in the environment 700. The sound modification system may include a module that processes the visual data and identifies one or more sound sources and/or sound scenes based on the identified landmark(s) and/or object(s) to identify sound scenes in the environment 700. For example, if the visual data includes cars travelling down a street, the visual data may be correlated with orientation 704 to determine that a traffic sound scene is present on one side of the user 702. As another example, if the visual data includes a large wall, the wall may be identified as a sound source (e.g., a sound reflection source).

In response to identifying one or more sounds and/or sound scenes in environment 700, the direction selection module 199 selects one or more directions corresponding to certain identified sound(s) and/or sound scene(s) as target directions for sound modification. The direction selection module 199 may make the selections based on modification settings 198. For example, the direction selection module 199 could select a direction in which a sound scene belonging to a sound scene type in the blacklist is identified. As another example, the direction selection module 199 could select a direction in which sounds belonging to a sound type in the blacklist are detected.

Figure 7A:
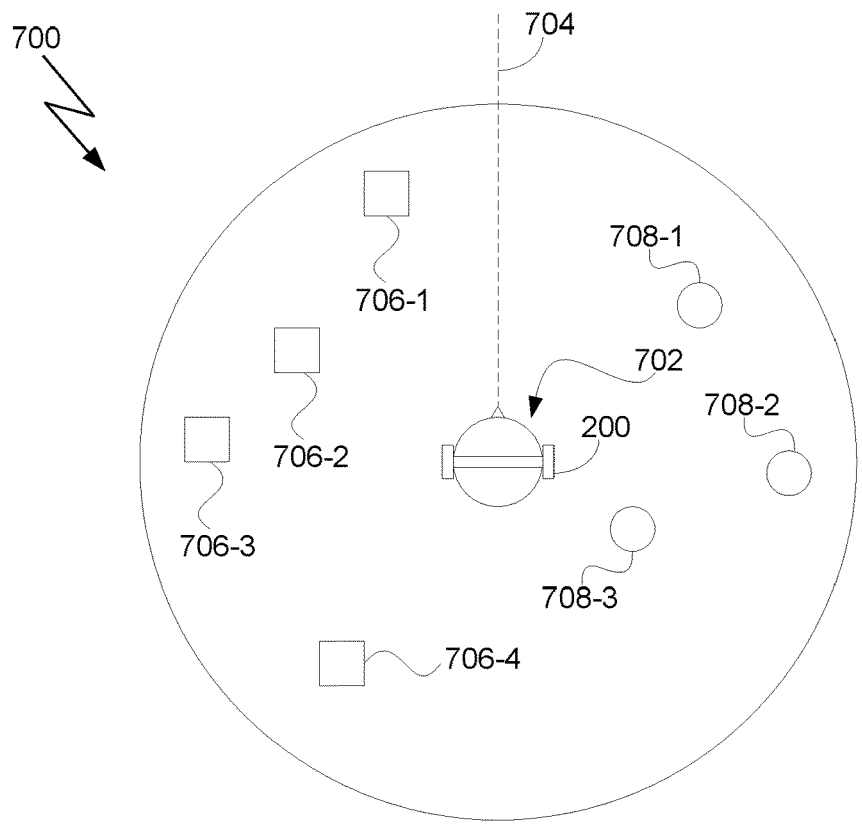
FIGS. 7A-7D illustrate techniques for identifying sounds and sound scenes and selecting a direction for sound modification, according to one or more aspects of the various embodiments.
Figure 7B:
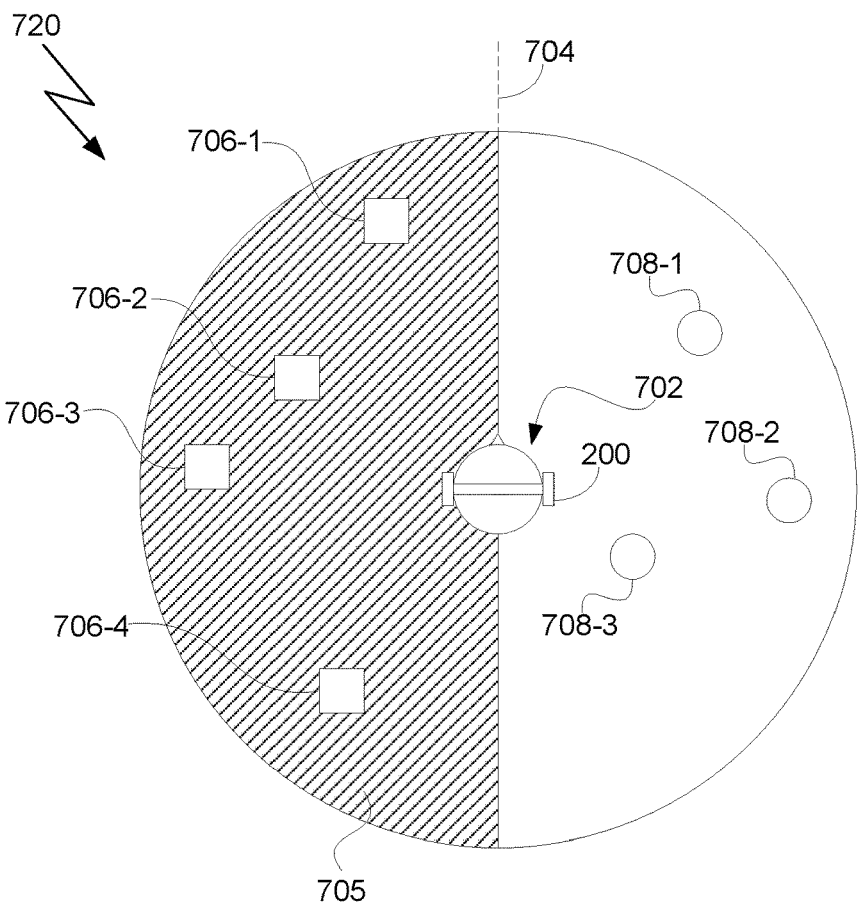

FIG. 7B illustrates environment 720 with direction 705 (shown as shaded) selected by direction selection module 199 as a target direction for sound modification. As described above, the direction selection module 199 may select one or more directions as target selections for sound modification. Based on the selection, the sound modification system may generate an audio signal that produces sound modification for detected sounds in the selected direction(s) (e.g., direction 705). For example, the audio signal generated for direction 705 would modify sounds from sources 706-1 thru 706-4 within direction 705. In some embodiments, the angular width of a selected direction (e.g., direction 705) is determined based on the number of and/or spacing between sound sources in the selected direction (e.g., number of and/or spacing between sources 706 in direction 705). Additionally, an angular width (e.g., an angular width increment) may be predefined (e.g., in modification settings 198). In some embodiments, the angular width of direction 705 may be narrower (e.g., more tightly bound to the spread of the sound sources within the direction) or wider (e.g., more loosely bound to the spread of the sound sources within the direction, with additional angular width surrounding the sound sources) with respect to the sound sources based on angular width settings in modification settings 198. It should be appreciated that the direction selection module 199 may select more than one direction to target for sound modification, and that the selected directions may be overlapping or non-overlapping.

In some embodiments, direction 705 is selected by direction selection module 199 based on detected sounds originating from sound sources 706. Sound identification module 190 may segment and identify sounds from sources 706. Direction selection module 199 may then match one or more of these sounds to sound types in the blacklist and select the direction(s) corresponding to the blacklisted sounds as targets for sound modification. For example, direction selection module 199 could select direction 705 based on matching of sounds from sources 706 to sound types in the blacklist.

In some embodiments, direction 705 is selected by direction selection module 199 based on a sound scene that was identified based on detected sounds. Sound identification module 190 may identify a sound scene based on detected sounds in the aggregate or based on detected sounds that have been segmented and identified individually. Direction selection module 199 may then match the identified sound scene to sound scene types in the blacklist, and select the direction(s) corresponding to the blacklisted sound scenes as targets for sound modification. For example, direction selection module 199 could select direction 705 based on matching of an identified sound scene in direction 705 to sound scene types in the blacklist.

In some embodiments, direction 705 is selected by direction selection module 199 based on sounds and/or a sound scene identified based on location data (e.g., location data 132) and/or visual data (e.g., visual data 134). Direction selection module 199 may receive location data from the location device 146 and correlate that location data with geographic map data (not shown) and orientation 704 to identify one or more sound sources and/or sound scenes within environment 700. For example, direction selection module 199 could correlate location data and orientation 704 with geographic map data to determine that the user 702, wearing headphones 200, is walking on a sidewalk with car traffic (and correspondingly a traffic sound scene) on a certain side of the user 702. As another example, if the visual data shows cars travelling down a street, the visual data may be correlated with orientation 704 to determine that a certain side of the user 702 has car traffic, and correspondingly a traffic sound scene. As a further example, if the location data indicates that the user is in proximity of a known construction site, and the blacklist includes construction equipment sounds and/or a construction sound scene, then a direction corresponding to the construction site may be selected for sound modification.

In some embodiments, the sound modification system may let certain sounds in the selected direction 705 pass through to the user based on one or more exceptions in the modification settings 108. For example, if the modification settings 198 include traffic sound scenes in the blacklist and emergency vehicle siren sounds in the whitelist, then the sound modification system would generate an audio signal in accordance with these settings—the audio signal would produce sound modification for detected sounds, except for emergency vehicle siren sounds, in the selected direction that includes the traffic sound scene.

In some embodiments, the environment map module 124 may generate a 2D or 3D map of the environment 700 based on the identified sounds and/or sound scenes. The environment map module 124 may generate the map based on one or more of detected sounds (e.g., noise data 126), location data 132, and visual data 132. The map generated by the environment map module 124 would determine the directions of the sound sources 706 and 708 and the sound scenes in relation to user 702 and orientation 704. Based on the map generated by the environment map module 124, direction selection module 199 may select one or more directions to target for sound modification (e.g., in accordance with modification settings 198).

In some embodiments, a sound scene may be identified within the map generated by the environment map module 124. For example, if the map includes multiple sources of car sounds coming from the same direction, then traffic sound source may be identified in that direction within the map generated by the environment map module 124 based on the multiple car sounds as an indicator of traffic activity. As another example, the environment map module 124 could correlate location data 132 and orientation data 129 with geographic map data to generate a map that identifies a traffic sound scene on a certain side of user 702 based on the user 702 walking on a street sidewalk with traffic on one side of the user 702. As a further example, if the visual data 134 includes cars travelling down a street, then the environmental map module 124 may generate a map, based on the visual data 134 and orientation data 129 (indicating orientation 704), that identifies a certain side of the user 702 as including a traffic sound scene.

Figure 7C:
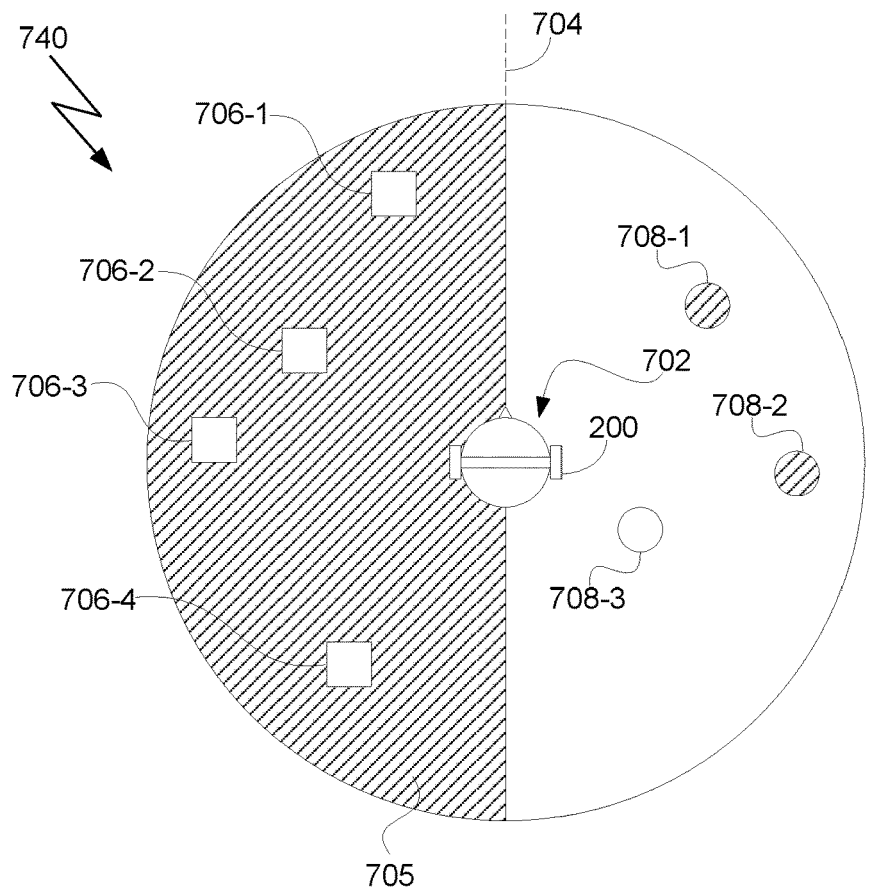

In some embodiments, sounds from sound sources outside of a selected direction may still be modified. FIG. 7C illustrates environment 740 with selected direction 705 targeted for sound modification. FIG. 7C further illustrates sources 708-1 and 708-2 that are also shown as shaded in the figure. Sources 708-1 and 708-2 correspond to sources of sound that are similar to sounds in the selected direction 705 or that are otherwise blacklisted sounds. For example, sources 708-1 and 708-2 may be sources of reflections of sounds originating from a source in direction 705. The sound modification system may generate an audio signal that modifies the specific sounds from sources 708-1 and 708-2 as well as sounds from direction 705. In some embodiments, one or more directions that include sources 708-1 and/or 708-2 are selected for sound modification as well as direction 705.

Figure 7D:
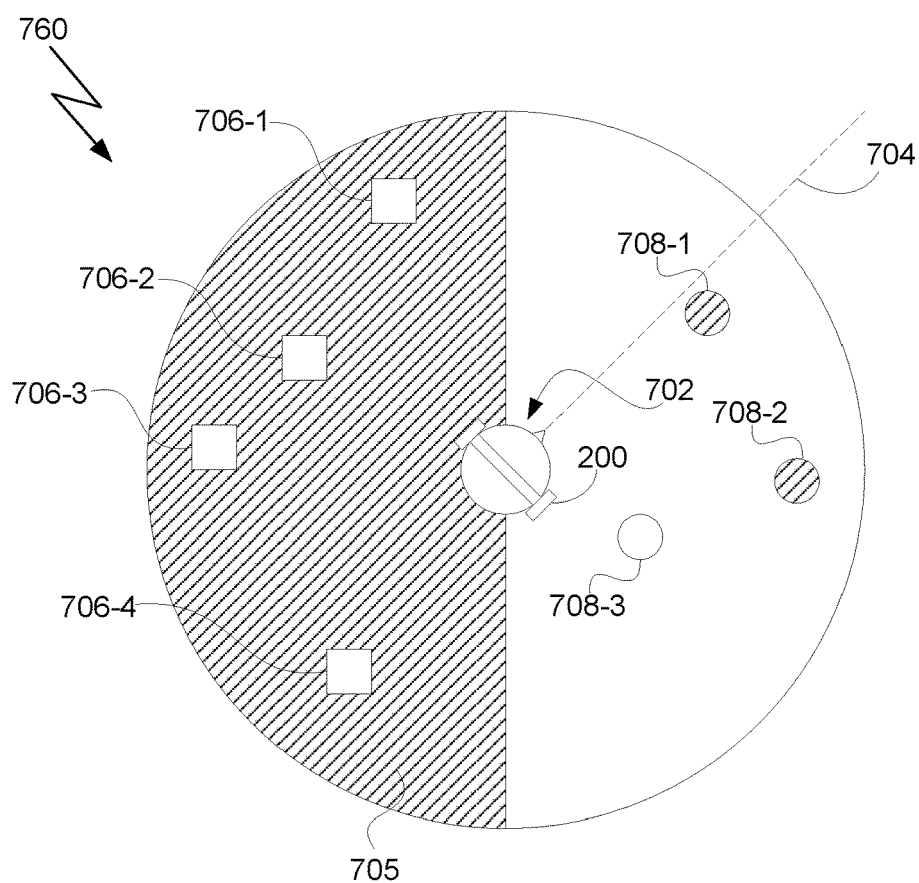

When user 702 moves or changes orientation, the sound modification system keeps track of the detected sounds and identified sound scenes, so that the selected direction is independent of the user's position or orientation. FIG. 7D illustrates environment 760, where user 702 has turned his head in place, as shown by orientation 704 pointing in a different direction than in environment 720 (FIG. 7B), for example. Selected direction 705 and sources 708-1 and 708-2 are in the same place in environment 760 as in environment 720 despite the user 702 turning his head because sources 706, 708-1 and 708-2 have not moved relative to the user 702. Thus, their positions remain the same relative to the user's position even though the user's orientation changed. If a sound source and/or the user has moved within the environment (e.g., the location of the user 702 relative to sources 706 and 708 has changed, the location of the user 702 relative to a sound scene has changed), the sound modification system may update the selected direction so that the selected direction continues to include the sound sources and/or sound scenes whose sounds are to be modified. Thus, the sound modification system can keep track of sources 706 and 708, and selected directions for sound modification, even as the user moves and/or changes orientation.

In some embodiments, the direction selection module 199 may select a direction, or forego selecting a direction, based on the time of day. For example, even if a traffic sound scene is identified on a side of the user based on the user being located on the sidewalk of a street, the direction selection module 199 may forego selecting the direction that includes the traffic sound scene if the time of day is late evening or late night, which indicates that traffic on the street is light and, thus, that the corresponding traffic sound scene is unlikely to be noisy.

In various embodiments, any of the modules and/or applications included in memory 120 may be implemented via a cloud-based architecture. For example, in some embodiments, the sound modification system 100 may transmit samples of detected sounds, location data, and/or visual data to a remote device (e.g., smartphone, a server system, a cloud computing platform, etc.) via I/O 130 or network 160. The remote device may process the samples of detected sounds, location data, and/or visual data to identify sounds and/or sound scenes. In some embodiments, the remote device could include one or more modules or applications that are the same as or similar to environment map module 124, sound identification module 190, and/or configuration module 196. The remote device could further include one or more databases analogous to sounds database 192 and sound scenes database 194 and may include data for multiple users that is the same as or similar to modification settings 198. The remote device may further select the direction(s) for sound modification based on the identified sounds and/or sound scenes (e.g., via a module and/or application in remote device that is the same as or similar to direction selection module 199) and transmit the selected direction(s) to the sound modification system 100. Alternatively, the remote device may transmit information corresponding to the identified sounds and/or sound scenes back to the sound modification system 100, where the direction selection module 199 may select the direction(s) for sound modification based on the information.

In some embodiments, the angular width of a selected direction may increase or decrease in size dynamically. For example, if sound sources in a selected direction move closer together, the angular width of the selected direction may be decreased. As another example, if sound sources in a selected direction move farther apart, then the angular width of the selected direction may be increased. The angular width change may be done tightly or loosely and/or at predefined increments based on the modification settings 198.

In some embodiments, the sound identification module 190 may be trained to identify specific sounds, such as voices of specific persons. The sound identification module 190 may be trained using any suitable machine learning training technique known in the art. The data obtained during the training (e.g., sound samples) may be stored in sounds database 192 and/or sound scenes database 194. The obtained data may, additionally or alternatively, be transmitted to a sounds database and/or sound scenes database in the cloud (e.g., to a cloud-based database).

Figures 8A, 8B:
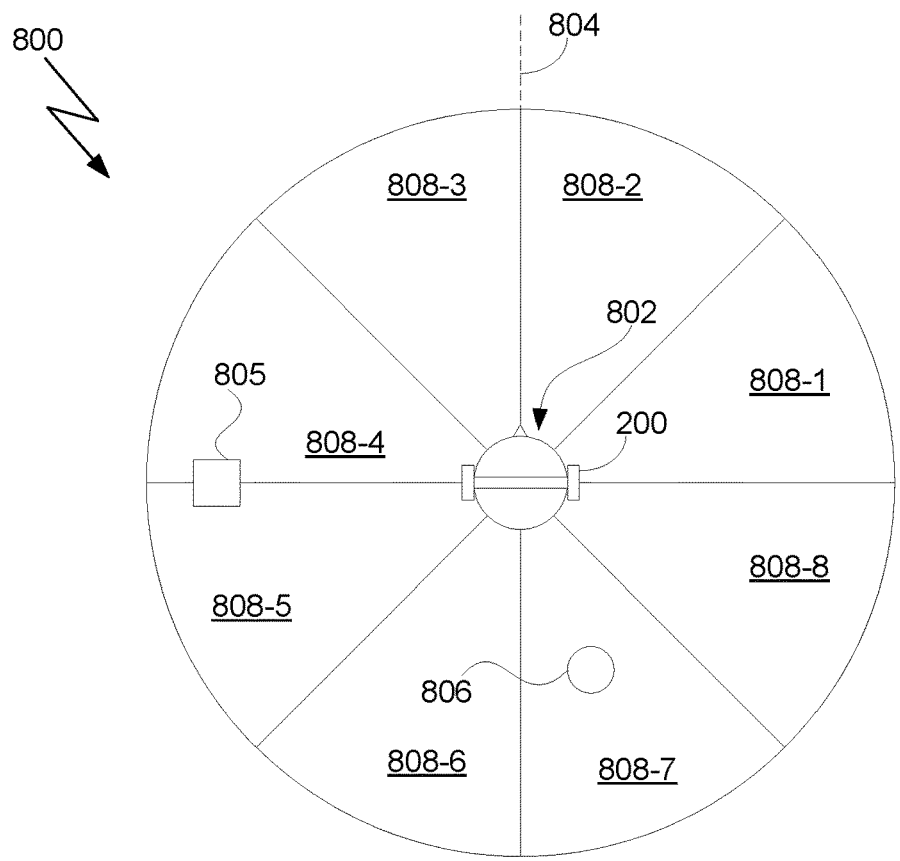
FIGS. 8A-8C illustrate techniques for identifying a sound and direction(s) from which the sound is received, according to one or more aspects of the various embodiments.
Figure 8C:
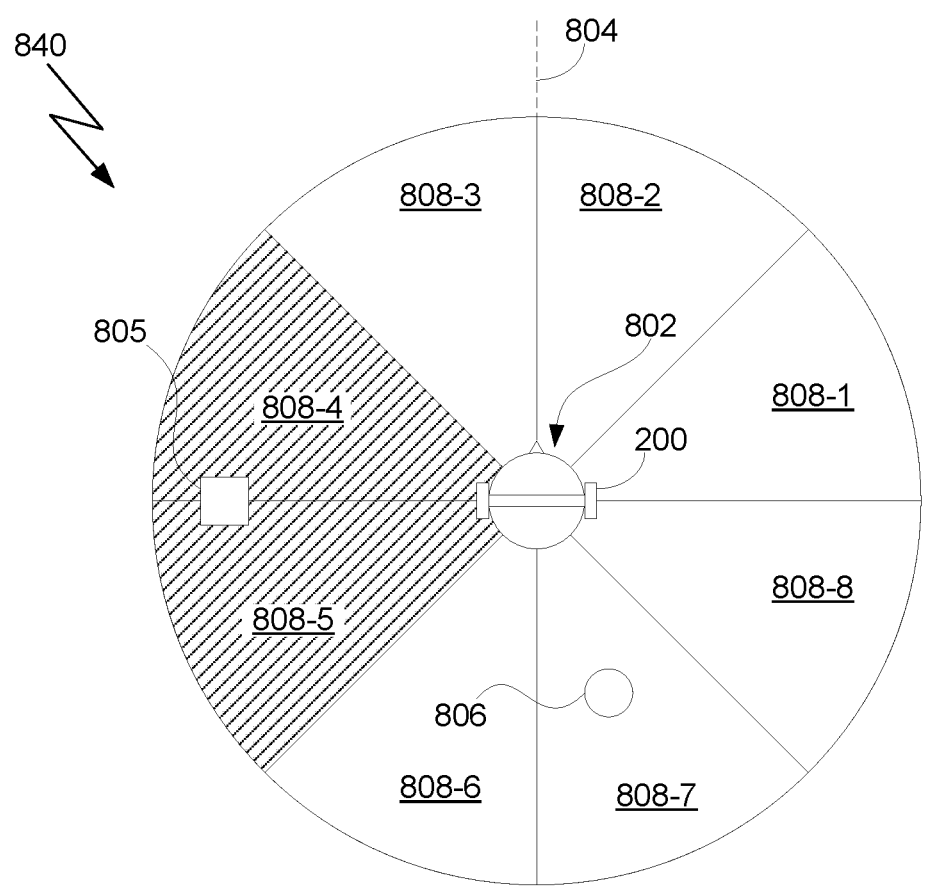

FIGS. 8A-8C illustrate techniques for identifying a sound and direction(s) from which the sound is received, according to various embodiments. As shown in FIG. 8A, a user 802 is in an orientation 804 within environment 800 while wearing headphones 200 on his or her head. Sound sources 805 and 806 are included in the environment 800 as sources of sounds (e.g., noises, voices, etc.) in the environment 700. The sound sources may correspond to the actual sources of the sounds (e.g., an object or person generating the sound) or a reflection source of a sound (e.g., a wall reflecting the sound). Sound source 805 emits sounds that match a sound type in the blacklist, and sound source 806 emits sounds that do not match a sound type in the blacklist. Environment 800 is divided into angular regions 808 of predefined angular width. The predefined angular width may be set in modification settings 198. As shown, the regions 808 may be 45-degree increments starting from 0 degrees. It should be appreciated that, while FIGS. 8A-8C illustrate a sound modification system deployed in headphones 200, the embodiments illustrated and described herein are applicable to sound modification systems deployed in other forms as well.

The direction selection module 199 may determine the direction to select for sound modification based on the locations of sound sources that emit blacklisted sounds in relation to divisions of the environment into angular regions (e.g., regions 808). FIG. 8B illustrates a table 820 illustrating the determination of a direction for sound modification based on whether a source of blacklisted sound is located in a region. Table 820 illustrates rows 828-1 thru 828-8, each corresponding to a respective region 808. Column 822 identifies the region. For example, row 828-1 corresponds to region 1, which corresponds to region 808-1 in environment 800, and row 828-2 corresponds to region 2, which corresponds to region 808-2. Column 824 indicates whether a sound to modify (e.g., a blacklisted sound) is located in a region (e.g., the source of the blacklisted sound is located in the region). Column 826 indicates the angular range of the region, with 0 degrees from orientation 804 as a reference angle. For example, the angular ranges shown in column 826 indicate that each region has an angular width of 45 degrees. It should be appreciated that a data structure like table 820 need not actually be generated by the direction selection module 199. Table 820, however, provides a conceptual depiction of the determinations that the direction selection module 199 may make as part of a process to select a direction for sound modification.

Returning to FIG. 8A, sound source 805, which emits a blacklisted sound, is located in regions 808-4 and 808-5. Accordingly, table 820, in column 824, indicates in rows 828-4 and 828-5 that regions 4 and 5 (corresponding to regions 808-4 and 808-5, respectively) include a sound to modify. Based on the determinations shown in table 820, direction selection module 199 may select a direction that combines regions 4 and 5, corresponding to regions 808-4 and 808-5, as a target direction for sound modification. FIG. 8C illustrates environment 840 with regions 808-4 and 808-5 shaded, indicating that the direction corresponding to these two regions have been selected for sound modification.

Figure 9:
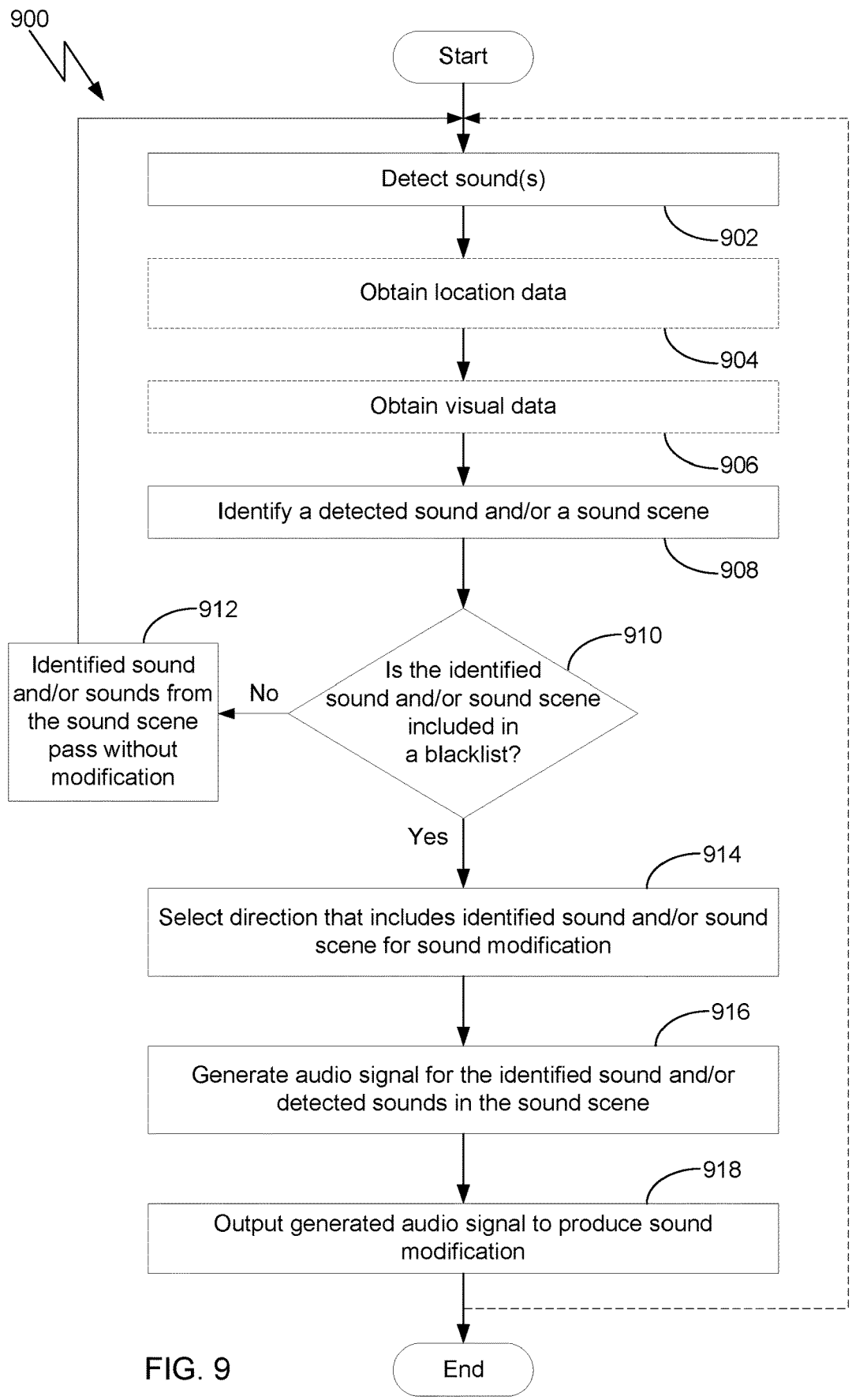
FIG. 9 is a flow diagram of method steps for directional sound modification, according to one or more aspects of the various embodiments.

FIG. 9 sets forth a flowchart of method steps for directional sound modification, according to one or more aspects of the various embodiments. Although the method steps are described in conjunction with the systems of FIGS. 1-8C, persons skilled in the art will understand that any system configured to perform the method steps, in any order, falls within the scope of the various embodiments.

As shown in FIG. 9, a method 900 begins at step 902, where audio sensors 150 detect one or more sounds. The audio sensors 150 capture sounds from the environment. At step 904, location device 146 obtains location data. For example, location data 146 could obtain latitude and longitude coordinates of the sound modification system and/or the user from GPS satellites. At step 906, a sensor device 142 obtains visual data. For example, a visual sensor captures images of the environment.

At step 908, sound identification module 190 identifies one or more detected sounds and/or sound scenes. The sound identification module 190 may segment and identify the sounds (and corresponding sound sources) using a machine learning technique and a sounds database 192. Additionally or alternatively, the sound identification module 190 may identify a sound scene based on the detected sounds (segmented and identified, or not) using a machine learning technique and a sound scenes database 194. Additionally or alternatively, the sound identification module 190 may identify sound sources and/or sound scenes based on the location data and/or the visual data.

In various embodiments, sounds and/or sound scenes may be identified based on one or more of the detected sounds themselves, location data, and visual data. For example, in some embodiments, a sound source and/or a sound scene may be identified based on location data and orientation data, but not based on captured sounds or images. As another example, sounds and/or sound scenes may be identified based on capture sounds and images, but not based on location data. Accordingly, I some embodiments, one or more of steps 906 and 908 are optional and may be omitted. Further, in some embodiments, the identification of detected sounds may be optional.

At step 910, a direction selection module 199 determines whether an identified sound and/or sound source is in a blacklist. In various embodiments, the sound and/or sound source are compared to sounds and/or sounds sources in the blacklist. Additionally or alternatively, the user's location is compared to blacklisted location to identify whether sound sources and/or sound scenes in the proximity of the location are in the blacklist. If the identified sound and/or sound scene is not in the blacklist (910—No), the method proceeds to step 912, where the identified sound and/or the sounds in the identified sound scene are passed through without modification. From step 912, the method may proceed back to step 902 to detect additional sounds and so forth. If the identified sound and/or sound scene is in the blacklist (910—Yes), the method proceeds to step 914.

At step 914, the direction selection module 199 selects a direction that includes the identified sound and/or sound source for sound modification. At step 916, audio signal module 122 generates an audio signal for the identified sound and/or sound scene. The audio signal is generated to produce sound modification for the identified sound and/or sound scene. At step 918, audio output device(s) 155 outputs the generated audio signal to produce the sound modification. From here, the method may proceed back to step 902 to detect additional sounds and so forth, or the method may end.

In sum, a sound modification system automatically identifies sounds and/or sound scenes within an environment and determines one or more directions for sound modification based on the identification of sounds and/or sound scenes. The sound modification system may segment captured sounds and identify individual sources of the sounds using a machine learning process. Similarly, the sound modification system may identify one or more sound scenes in the environment based on at least the captured sounds using a machine learning process. The sound modification system determines one or more sound modification directions based on the identified sound sources and/or sound scenes, and generates audio signals to modify sounds in the determined directions.

At least one advantage and technological improvement of the disclosed technique is that target directions for sound modification may be automatically determined with little or no user interaction. The user is relieved from having to manually direct the sound modification system which directions to target for sound modification. Additionally, new sounds that enter the environment may be targeted for modification with little or no user interaction. Accordingly, unwanted noise in the environment can be reduced or eliminated while still enabling the user to hear sounds of interest that originate from other directions in the environment.

1. In some embodiments, a system comprises a plurality of audio sensors configured to acquire sound from an environment, and at least one processor coupled to the plurality of audio sensors and configured to determine a direction within the environment; generate an audio signal based on sound acquired from the direction within the environment; and transmit the audio signal to at least one audio output device to generate audio output, wherein the audio output combines with the sound from the direction within the environment to produce a modified sound.

2. The system of clause 1, wherein the at least one processor is further configured to identify, based on the sound acquired from the environment, at least one sound type included in the environment, and wherein the direction within the environment is determined based on the at least one sound type.

3. The system of clauses 1 or 2, wherein the at least one processor is configured to determine the direction within the environment by identifying a first sound type included in the at least one sound type; and identifying the direction within the environment from which the first sound type was acquired by the plurality of audio sensors.

4. The system of any of clauses 1-3, wherein the at least one processor is configured to determine the direction within the environment by identifying a first sound type included in the at least one sound type; and identifying at least one audio sensor included in the plurality of audio sensors that acquired the first sound type, wherein the direction within the environment corresponds to a direction from which the at least one audio sensor acquired sound.

5. The system of any of clauses 1-4, wherein the at least one processor is configured to determine the direction within the environment by identifying a plurality of sound types included in the at least one sound type; determining that the plurality of sound types correspond to a sound scene included in a blacklist; and identifying the direction within the environment from which the plurality of sound types was acquired by the plurality of audio sensors.

6. The system of any of clauses 1-5, wherein the at least one processor is configured to determine the direction within the environment by obtaining, via at least one location device, a first location of the system; identifying at least one sound type included in the environment based on the first location of the system; determining that the at least one sound type is included in a blacklist; and determining the direction within the environment based on the location of the system and a location of the at least one sound type.

7. The system of any of clauses 1-6, wherein the at least one processors is further configured to obtain, via the at least one location device, a second location of the system, wherein the second location of the system is different than the first location of the system; identify at least one second sound type included in the environment based on the second location of the system; determine that the at least one second sound type is included in the blacklist; determine a second direction within the environment based on the second location of the system and a location of the at least one second sound type; generate a second audio signal based on sound acquired from the second direction within the environment; and transmit the second audio signal to the at least one audio output device to generate second audio output, wherein the second audio output combines with the sound from the second direction within the environment to produce a second modified sound.

8. The system of any of clauses 1-7, wherein the at least one processor is configured to determine the direction within the environment by acquiring, via at least one image sensor, visual data of the environment; identifying at least one sound type in the environment based on the visual data; determining that the at least one sound type is included in a blacklist; and determining the direction within the environment based on a location in the visual data associated with the at least one sound type.

9. In some embodiments, a method for directional sound modification comprises acquiring sound from an environment via a plurality of audio sensors; determining a direction within the environment; generating an audio signal based on sound acquired from the direction within the environment; and transmitting the audio signal to at least one audio output device to generate audio output, wherein the audio output combines with the sound from the direction within the environment to produce a modified sound.

10. The method of clause 9, wherein determining the direction within the environment comprises identifying a first sound type included in the environment; and determining the direction within the environment based on the first sound type.

11. The method of clauses 9 or 10, wherein identifying the first sound type comprises obtaining, via at least one image sensor, visual data of the environment; and identifying, in the visual data, at least one object that corresponds to the first sound type.

12. The method of any of clauses 9-11, wherein identifying the first sound type comprises obtaining location data indicating a location associated with the plurality of audio sensors; and identifying the first sound type based on the location associated with the plurality of audio sensors.

13. The method of any of clauses 9-12, further comprising obtaining second location data indicating a second location associated with the plurality of audio sensors; determining a second direction within the environment based on the second location associated with the plurality of audio sensors and a location that corresponds to the first sound type; generating a second audio signal based on sound acquired from the second direction within the environment; and transmitting the second audio signal to the at least one audio output device to generate second audio output, wherein the second audio output combines with the sound from the second direction within the environment to produce a second modified sound.

14. The method of any of clauses 9-13, wherein determining the direction within the environment comprises identifying, based on the sound acquired from the environment, a first sound type included in the environment; and determining the direction within the environment based on the first sound type.

15. The method of any of clauses 9-14, wherein identifying the first sound type comprises comparing the sound acquired from the environment to a database of sounds.

16. In some embodiments, a non-transitory computer readable storage medium stores instructions, that, when executed by at least one processor, cause the at least one processor to perform the steps of acquiring, via at least one audio sensor included in a plurality of audio sensors, a first sound from an environment; identifying a first sound type included in the environment based on the first sound; determining a direction within the environment based on the first sound type, wherein the first sound is acquired from the direction within the environment; generating an audio signal based on the first sound; and transmitting the audio signal to at least one audio output device to generate audio output, wherein the audio output combines with the first sound to produce a modified sound.

17. The non-transitory computer readable storage medium of clause 16, wherein determining the direction within the environment comprises determining that the first sound was acquired via the at least one audio sensor, wherein the at least on audio sensor is oriented to acquire sound from the direction within the environment.

18. The non-transitory computer readable storage medium of clauses 16 or 17, wherein identifying the first sound type comprises applying at least one machine learning algorithm to the first sound.

19. The non-transitory computer readable storage medium of any of clauses 16-18, wherein identifying the first sound type comprises obtaining visual data of the environment; and identifying the first sound type based on the first sound and the visual data.

20. The non-transitory computer readable storage medium of any of clauses 16-19, wherein identifying the first sound type comprises obtaining location data indicating a location associated with the plurality of audio sensors; and identifying the first sound type based on the first sound and the location associated with the plurality of audio sensors.

Any and all combinations of any of the claim elements recited in any of the claims and/or any elements described in this application, in any fashion, fall within the contemplated scope of the described embodiments and present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system, comprising:
a plurality of audio sensors configured to acquire sound from an environment; and
at least one processor coupled to the plurality of audio sensors and configured to:
determine a direction within the environment based on at least one of a first sound type included in the environment, a location of the system within the environment, and visual data acquired from the environment;
generate an audio signal based on sound acquired from the direction within the environment; and
transmit the audio signal to at least one audio output device to generate audio output, wherein the audio output combines with the sound from the direction within the environment to produce a modified sound.

2. The system of claim 1, wherein the at least one processor is further configured to identify, based on the sound acquired from the environment, the first sound type included in the environment.

3. The system of claim 2, wherein the at least one processor is configured to determine the direction within the environment by identifying the direction within the environment from which the first sound type was acquired by the plurality of audio sensors.

4. The system of claim 2, wherein the at least one processor is configured to determine the direction within the environment by identifying at least one audio sensor included in the plurality of audio sensors that acquired the first sound type, wherein the direction within the environment corresponds to a direction from which the at least one audio sensor acquired sound.

5. The system of claim 2, wherein the at least one processor is configured to determine the direction within the environment by:
identifying a plurality of sound types that includes the first sound type;
determining that the plurality of sound types correspond to a sound scene included in a blacklist; and
identifying the direction within the environment from which the plurality of sound types was acquired by the plurality of audio sensors.

6. The system of claim 1, wherein the at least one processor is configured to determine the direction within the environment by:
obtaining, via at least one location device, a first location of the system;
identifying the first sound type included in the environment based on the first location of the system;
determining that the first sound type is included in a blacklist; and
determining the direction within the environment based on the location of the system and a location of the first sound type.

7. The system of claim 6, wherein the at least one processor is further configured to:
obtain, via the at least one location device, a second location of the system, wherein the second location of the system is different than the first location of the system;
identify at least one second sound type included in the environment based on the second location of the system;
determine that the at least one second sound type is included in the blacklist;
determine a second direction within the environment based on the second location of the system and a location of the at least one second sound type;
generate a second audio signal based on sound acquired from the second direction within the environment; and
transmit the second audio signal to the at least one audio output device to generate second audio output, wherein the second audio output combines with the sound from the second direction within the environment to produce a second modified sound.

8. The system of claim 1, wherein the at least one processor is configured to determine the direction within the environment by:
acquiring, via at least one image sensor, visual data of the environment;
identifying the first sound type based on the visual data;
determining that the at least one sound type is included in a blacklist; and
determining the direction within the environment based on a location in the visual data associated with the at least one sound type.

9. A method for directional sound modification, comprising:
acquiring sound from an environment via a plurality of audio sensors;
determining a direction within the environment based on at least one of a first sound type included in the environment, a location of the system within the environment, and visual data acquired from the environment;
generating an audio signal based on sound acquired from the direction within the environment; and
transmitting the audio signal to at least one audio output device to generate audio output, wherein the audio output combines with the sound from the direction within the environment to produce a modified sound.

10. The method of claim 9, further comprising identifying the first sound type included in the environment.

11. The method of claim 10, wherein identifying the first sound type comprises:
obtaining, via at least one image sensor, visual data of the environment; and
identifying, in the visual data, at least one object that corresponds to the first sound type.

12. The method of claim 10, wherein identifying the first sound type comprises:
obtaining location data indicating a location associated with the plurality of audio sensors; and identifying the first sound type based on the location associated with the plurality of audio sensors.

13. The method of claim 12, further comprising:
obtaining second location data indicating a second location associated with the plurality of audio sensors;
determining a second direction within the environment based on the second location associated with the plurality of audio sensors and a location that corresponds to the first sound type;
generating a second audio signal based on sound acquired from the second direction within the environment; and
transmitting the second audio signal to the at least one audio output device to generate second audio output, wherein the second audio output combines with the sound from the second direction within the environment to produce a second modified sound.

14. The method of claim 10, wherein identifying the first sound type comprises comparing the sound acquired from the environment to a database of sounds.

15. One or more non-transitory computer readable storage media storing instructions, that, when executed by at least one processor, cause the at least one processor to perform the steps of:
acquiring, via at least one audio sensor included in a plurality of audio sensors, a first sound from an environment;
identifying a first sound type included in the environment based on the first sound;
determining a direction within the environment based on at least one of the first sound type, a location of the system within the environment, and visual data acquired from the environment, wherein the first sound is acquired from the direction within the environment;
generating an audio signal based on the first sound; and
transmitting the audio signal to at least one audio output device to generate audio output, wherein the audio output combines with the first sound to produce a modified sound.

16. The one or more non-transitory computer readable storage media of claim 15, wherein determining the direction within the environment comprises determining that the first sound was acquired via the at least one audio sensor, wherein the at least on audio sensor is oriented to acquire sound from the direction within the environment.

17. The one or more non-transitory computer readable storage media of claim 15, wherein identifying the first sound type comprises applying at least one machine learning algorithm to the first sound.

18. The one or more non-transitory computer readable storage media of claim 15, wherein identifying the first sound type comprises:
obtaining visual data of the environment; and
identifying the first sound type based on the first sound and the visual data.

19. The one or more non-transitory computer readable storage media of claim 15, wherein identifying the first sound type comprises:
obtaining location data indicating a location associated with the plurality of audio sensors; and
identifying the first sound type based on the first sound and the location associated with the plurality of audio sensors.

* * * * *